(12) United States Patent
Bill et al.

(10) Patent No.: US 12,391,077 B2
(45) Date of Patent: Aug. 19, 2025

(54) AIRCRAFT SYSTEM AND METHOD

(71) Applicants: Airbus Operations Limited, Bristol (GB); Airbus Operations GmbH, Hamburg (DE); Airbus Operations (S.A.S.), Toulouse (FR)

(72) Inventors: Andrew Bill, Bristol (GB); Stephan Marwedel, Hamburg (DE); Christelle Duchossoy, Toulouse (FR)

(73) Assignees: AIRBUS OPERATIONS LIMITED, Bristol (GB); AIRBUS OPERATIONS GMBH, Hamburg (DE); AIRBUS OPERATIONS (S.A.S.), Toulouse (DE)

( * ) Notice: Subject to any disclaimer, the term of this patent is extended or adjusted under 35 U.S.C. 154(b) by 1 day.

(21) Appl. No.: 17/978,757

(22) Filed: Nov. 1, 2022

(65) Prior Publication Data

US 2023/0166568 A1    Jun. 1, 2023

(30) Foreign Application Priority Data

Nov. 2, 2021    (GB) ...................................... 2115730

(51) Int. Cl.
*B60C 23/04*      (2006.01)
(52) U.S. Cl.
CPC ...... *B60C 23/0471* (2013.01); *B60C 23/0406* (2013.01); *B60C 23/0479* (2013.01); *B60C 2200/02* (2013.01)
(58) Field of Classification Search
None
See application file for complete search history.

(56) References Cited

U.S. PATENT DOCUMENTS

| | | | |
|---|---|---|---|
| 4,059,823 A | 11/1977 | Martin et al. | |
| 4,734,674 A | 3/1988 | Thomas et al. | |
| 5,439,331 A | * 8/1995 | Andrew | F16L 41/04 |
| | | | 408/101 |

(Continued)

FOREIGN PATENT DOCUMENTS

| | | |
|---|---|---|
| CN | 111361363 | 7/2020 |
| EP | 2 910 393 | 8/2015 |

(Continued)

OTHER PUBLICATIONS

European Search Report cited in EP 22305400.8 mailed Sep. 22, 2022, 7 pages.

(Continued)

*Primary Examiner* — Carlos Garcia
(74) *Attorney, Agent, or Firm* — Nixon & Vanderhye P.C.

(57) ABSTRACT

A method of communicating configuration data of a tire pressure monitoring device configured to be affixed to a wheel in use. The method includes, at the tire pressure monitoring device, receiving a request to confirm configuration data, and responsive to receipt of the request to confirm configuration data, transmitting a configuration data signal which encodes the configuration data. The configuration data signal is configured to be received and understood by a human. The configuration data signal is indicative of any of an aircraft wheel location at which the tire pressure monitoring device is intended to be located, and a security code representative of security parameters of the tire pressure monitoring device.

20 Claims, 17 Drawing Sheets

(56) References Cited

U.S. PATENT DOCUMENTS

| | | | |
|---|---|---|---|
| 6,087,930 A | 7/2000 | Kulka et al. | |
| 6,507,276 B1 | 1/2003 | Young | |
| 6,861,950 B2 | 3/2005 | Katou | |
| 6,988,026 B2 * | 1/2006 | Breed | B60R 21/20 |
| | | | 701/33.9 |
| 7,295,849 B2 | 11/2007 | Ghabra | |
| 8,599,044 B2 | 12/2013 | Maggiore et al. | |
| 11,814,189 B2 * | 11/2023 | Bill | B64D 45/0005 |
| 2002/0014115 A1 | 2/2002 | Young | |
| 2004/0069057 A1 | 4/2004 | Sapir | |
| 2006/0220805 A1 | 10/2006 | Thomas et al. | |
| 2007/0188315 A1 | 8/2007 | Chung | |
| 2007/0193349 A1 | 8/2007 | Petrucelli | |
| 2009/0109012 A1 | 4/2009 | Petrucelli | |
| 2010/0090878 A1 | 4/2010 | Teuling | |
| 2014/0070928 A1 | 3/2014 | Yu et al. | |
| 2021/0029634 A1 | 1/2021 | Strahan | |
| 2021/0039450 A1 | 2/2021 | Dages et al. | |
| 2021/0237896 A1 * | 8/2021 | Bill | H04W 4/38 |
| 2022/0055420 A1 | 2/2022 | Bill | |
| 2022/0055421 A1 * | 2/2022 | Bill | B60C 23/0479 |
| 2022/0086934 A1 * | 3/2022 | Bill | B60C 23/0461 |
| 2022/0124490 A1 * | 4/2022 | Bill | H04W 4/023 |
| 2022/0134812 A1 * | 5/2022 | Bill | B60C 23/0477 |
| | | | 701/32.7 |
| 2022/0134813 A1 * | 5/2022 | Bill | B60C 23/0476 |
| | | | 701/29.6 |
| 2022/0134815 A1 * | 5/2022 | Bill | G06F 3/0652 |
| | | | 701/31.7 |
| 2022/0134816 A1 * | 5/2022 | Bill | B60C 23/0406 |
| | | | 340/945 |
| 2022/0134818 A1 * | 5/2022 | Bill | B60C 23/0479 |
| | | | 73/146.5 |
| 2022/0139119 A1 * | 5/2022 | Bill | B60C 23/0477 |
| | | | 701/29.2 |
| 2022/0185038 A1 * | 6/2022 | Bill | B60C 23/045 |
| 2023/0166568 A1 * | 6/2023 | Bill | B60C 23/0479 |
| | | | 340/12.23 |
| 2023/0227175 A1 * | 7/2023 | Bill | B64D 45/00 |
| | | | 701/31.4 |
| 2023/0311592 A1 * | 10/2023 | Bill | B60C 23/0474 |
| | | | 701/34.4 |
| 2023/0311593 A1 * | 10/2023 | Bill | B60C 23/0471 |
| | | | 702/98 |
| 2023/0364950 A1 * | 11/2023 | Bill | B60C 23/0474 |
| 2023/0364951 A1 * | 11/2023 | Bill | B60C 23/0474 |
| 2023/0366784 A1 * | 11/2023 | Bill | G01M 17/02 |
| 2023/0366785 A1 * | 11/2023 | Bill | B60C 23/0486 |
| 2023/0373652 A1 * | 11/2023 | Bill | B60C 23/0481 |
| 2024/0059108 A1 * | 2/2024 | Bill | B60C 23/0479 |

FOREIGN PATENT DOCUMENTS

| | | |
|---|---|---|
| EP | 3 069 903 | 9/2016 |
| EP | 3 118 030 | 1/2017 |
| EP | 3 150 408 | 4/2017 |
| EP | 3 498 501 | 6/2019 |
| EP | 3991996 | 5/2022 |
| GB | 2490302 | 10/2012 |
| GB | 2569383 A | 6/2019 |
| GB | 2584847 | 12/2020 |
| GB | 2584853 A | 12/2020 |
| GB | 2617599 A | 10/2023 |
| GB | 2618311 A | 11/2023 |
| GB | 2623795 A | 5/2024 |
| JP | 2003-291615 | 10/2003 |
| WO | 2017179968 | 10/2017 |

OTHER PUBLICATIONS

Combined Search and Examination Report for GB Application No. 2115730.0 dated Mar. 1, 2022, 9 pages.
GB2403569.3, Search Report (Aug. 12, 2024)(5 pages).
Combined Search and Examination Report cited in GB 2410769.0mailed Jan. 21, 2025, 6 pages.

* cited by examiner

You are checking
Reference Pressure =
178 PSI

The LED will now flash:

8 x Red Flash
1 x Green Flash at end

Did you see 8 x RED FLASH

YES

Fig. 5F — 62

Thank you

Ref Pressure Confirmed
as
178 PSI

Fig. 5G

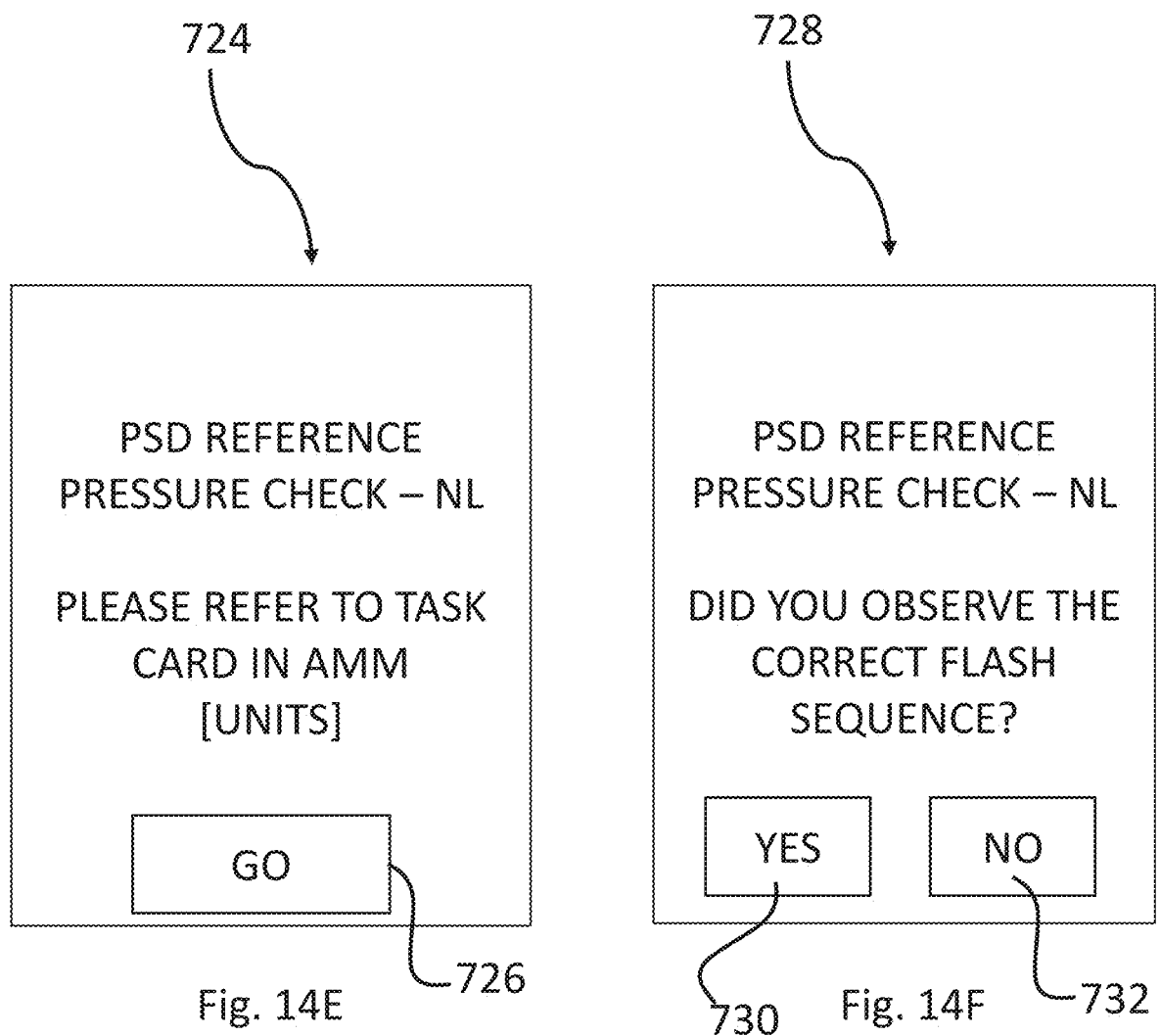

AIRCRAFT SYSTEM AND METHOD

RELATED APPLICATION

This application incorporates by reference and claims priority to United Kingdom patent application GB 2115730.0, filed Nov. 2, 2021.

TECHNICAL FIELD

The present invention relates to tire pressure monitoring devices, and methods of communicating configuration data from tire pressure monitoring devices.

BACKGROUND

Checking tire pressure is an important part of the maintenance of a vehicle. Tire pressures should be maintained at predetermined pressures to ensure that a tire performs as intended by the manufacturer. Incorrect tire pressure can lead to a tire failing, perhaps bursting and causing damage to the vehicle and/or a loss of control. To check a tire pressure, it is important to know what reference pressure is defined for the tire.

SUMMARY

A first aspect of the present invention provides a method of communicating configuration data of a tire pressure monitoring device configured to be affixed to a wheel in use. The method comprises, at the tire pressure monitoring device: receiving a request to confirm configuration data; responsive to receipt of the request to confirm configuration data, transmitting a configuration data signal which encodes the configuration data; wherein the configuration data signal is configured to be received and understood by a human, and the configuration data signal is indicative of any of an aircraft wheel location at which the tire pressure monitoring device is intended to be located, and a security code representative of security parameters of the tire pressure monitoring device.

This allows the data from the tire pressure monitoring device to be confirmed without requiring intermediate devices to interpret or display the data. In particular, it may be necessary to ensure that configuration data has been correctly entered into a tire pressure monitoring device in a way which can be trusted. By reducing intermediate devices, then the requirement for intermediate devices to also be trusted is removed. For example, in aircraft, in order to obtain a desired Development Assurance Level (DAL, for example DAL B) for a vehicle tire system a strict certification is required. It is desirable to reduce intermediate devices to provide a robust system while reducing certification requirements. Reducing intermediate devices may reduce the cost of a system, may reduce the cost of manufacture of a system, and may reduce the cost of operation in use.

By transmitting the configuration data signal from the tire pressure monitoring device, it can be ensured that the configuration data signal has come from a known, trusted, source. Furthermore, by ensuring that the configuration data signal is configured to be received and understood by a human, the need for a trusted device may be reduced and/or eliminated. Thus the required DAL may be achieved without the need for an additional trusted device, and the human receiving the data may verify the data. Untrusted information sources cannot be used to directly verify data when DAL is required in view of their untrusted nature. In the present case, untrusted information sources can be used, with a user interacting with the untrusted device and forming the trusted source. For example, by inputting confirmation of configuration data transmitted directly from the tire pressure monitoring device to an untrusted device, the user can form a trusted source. The configuration data signal may be configured to be directly transmitted to a human from the tire pressure monitoring device, for example without first being transferred to a further intermediate device.

Verifying that the aircraft wheel location at which the tire pressure monitoring device is intended to be located is correctly installed in the tire pressure monitoring device may ensure that tire pressure monitoring devices are correctly configured. Verifying security codes may, for example, ensure that correct configuration of the tire pressure monitoring device, such as configuration for encrypted communication between tire pressure monitoring devices, has been performed.

The configuration data signal may comprise a visual signal, and the visual signal may be transmitted using a visual indicator of the trusted tire pressure monitoring device. A visual signal is a relatively straightforward signal type, which can be easily received and understood by a human.

The visual indicator may comprise a light source, and the method then comprises selectively illuminating the light source to transmit the configuration data signal. The presence and absence of light can be easily received and understood by a human, and hence the configuration data signal may be relatively simple.

The light source may comprise a Light Emitting Diode (LED). The light source may be a multi-purpose light source, for example a light source configured to provide functionality in addition to transmitting the configuration data signal. This can reduce the cost and complexity of the tire pressure monitoring device. For example, the light source may also be configured to be selectively illuminated to display a health status of a tire or a tire system, such as whether a monitored tire pressure is acceptable or if maintenance is required.

The configuration data signal may comprise a number, and the selective illumination of the light source may comprise encoding the number into an illumination sequence representing individual digits of the number. For example, a first number of illuminations of the light source may represent a first digit of the number, a second number of illuminations of the light source may represent a second digit of the number, and so on. This provides a relatively simple signal which is easily received and understood by a human. The number of illuminations may directly correspond to the digit of the number, for example with one illumination representing the digit "1", and five illuminations representing the digit "5". Each illumination may be a distinct flash of the light source having an illumination period of at least 100 ms, at least 200 ms, at least 300 ms, at least 400 ms or at least 500 ms, so that it can be observed directly by a human.

In other examples, the visual indicator comprises a display of the tire pressure monitoring device. For example, the display may be a matrix-display or segment-display on which configuration data can be displayed in readable characters to enable a user to read configuration data from the display.

The configuration data signal may comprise an audible signal, and the audible signal may be transmitted using a transducer of the trusted tire pressure monitoring device. The method may comprise selectively actuating the transducer to transmit the signal. For example, the transducer can be caused to beep or a text-to-speech engine can convert configuration data into spoken information. Some examples may communicate the configuration data signal using both an audible signal and a visual signal.

The configuration data signal may comprise a number, and the selective actuation of the transducer may comprise encoding the number into an actuation representing individual digits of the number. For example, a first number of actuations or sounds of the transducer may represent a first digit of the number, a second number of actuations or sounds of the transducer may represent a second digit of the number, and so on. As discussed above this can be easily received and understood by a human.

The configuration data signal may comprise a start signal indicating a start of transmission, an end signal indicating an end of transmission, and an intermediate signal indicative of configuration data stored in the trusted tire pressure monitoring devices. This helps a human receiving the data configuration signal to interpret it, enabling the start and end, and when the configuration data is meant to be received, to be understood.

The start signal may comprise a first type of signal, the intermediate signal may comprise a second type of signal, and the end signal may comprise a third type of signal. This can further distinguish between the start, end and intermediate signals, and provide further clarity for a human as to which signal indicates configuration data. Various combinations of the first, second and third types of signals are possible. For example, the first and third types of signals may comprise an audible signal and the second type of signal may comprise a visual signal, or vice versa. Alternatively, or additionally, the first type of signal may comprise a first type of visual signal, such as a first colour of light, the second type of signal may comprise a second type of visual signal, such as a second colour light different to the first colour light, and the third type of signal may comprise a third type of visual signal, such as a third colour light different to the first and second colours of light. This can provide a straightforward way to distinguish between the start/end signals and the intermediate signal.

The configuration data signal may comprise a plurality of sub-signals, each sub-signal comprising a start signal indicating a start of transmission of the sub-signal, an end signal indicating an end of transmission of the sub-signal, and an intermediate signal indicative of at least a portion of configuration data stored in the tire pressure monitoring device. This enables the data configuration signal to be split into smaller pieces, making it more easily understood by a human. Each intermediate signal may be indicative of a portion of configuration data stored in the tire pressure monitoring device. For example, each intermediate signal may be indicative of a digit of a reference pressure stored in memory of the tire pressure monitoring device.

An end signal of a first sub-signal may comprise a start signal of a second sequential sub-signal. For example, a same sub-signal signal may indicate the end of one sub-signal and the start of another sub-signal. This can reduce the time required to transmit the configuration data signal.

In some examples, each sub-signal is confirmed as being received and understood by a human before a next sequential sub-signal is transmitted. This improves the reliability of the verification of the configuration data because a human receiving the data does not have to rely on their memory to the same extent. Each sub-signal may be transmitted in response to verification of a previous sub-signal by a user.

The method may comprise transmitting an alert indicating that transmission of the configuration data signal is about to begin. This may enable a human to know when a signal is to be transmitted for easier understanding and subsequent verification of the data configuration signal. For example, this may enable the configuration data signal to be received, understood, and verified in a stepwise manner, which may be clear to a human. The alert can be a different signal from the start signal discussed above and can be additional or alternative to the start signal. For example, the alert can be a first type of signal, such as an audible signal, and the start signal can be a second type of signal, such as a visual signal.

The method may comprise verifying, by a human, that the configuration data of the tire pressure monitoring device matches an expected configuration data. This removes the need for another trusted device to perform verification, because the human may be regarded as a trusted source. Verification by a human that the configuration data of the trusted tire pressure monitoring device matches expected configuration data may take place using an untrusted device, for example by an untrusted intermediate device, such as a smartphone, tablet or other computing device, which provides the user with a prompt of what configuration data is expected. Although the intermediate device is untrusted, if it is faulty or has malicious software installed then the end result will be that the configuration is not verified, so safety is provided. This may reduce cost associated with the verification procedure compared to a process that requires an intermediate, independent, trusted device. It can also more provide more flexibility; because the intermediate device is untrusted its functionality can be provided by an application or app running on different hardware platforms without all those platforms having to be certified.

Verifying, by a human, that the configuration data of the tire pressure monitoring device matches the expected configuration data, may comprise comparing the configuration data to expected configuration contained in an aircraft maintenance manual accessible to the human.

The expected configuration data may comprise a security code representative of security parameters of a further tire pressure monitoring device. The security code representative of security parameters of a further tire pressure monitoring device may be transmitted to the human in a further data configuration signal from the further tire pressure monitoring device.

The request to confirm configuration data may be received at the tire pressure monitoring device via a short-range communication protocol. This provides security benefits as physical proximity is required and can also provide an operational benefit if the range is short enough that is generally received by a single device to prevent a request from being picked-up by a wrong tire pressure monitoring device. The request may be submitted via a communication protocol with a range of less than 5 m, less than 2 m, less than 1 m, less than 50 cm, less than 30 cm or less than 15 cm. Suitable communication protocols include Near Field Communication (NFC). In some examples, no identifier is included in the request to confirm configuration data, with a short range of transmission and physical proximity indicating the device to respond. Alternatively, the request may include a unique identifier of a device. The unique identifier may be input by a user by reading a marking on the tire pressure monitoring device or determined by data provided on or by the tire pressure monitoring device, such as by scanning or a QR code of the tire pressure monitoring device, NFC, or Radio Frequency Identification (RFID) tag interrogation.

The method may comprise transmitting the configuration data signal to a further tire pressure monitoring device, and subsequently transmitting the configuration data signal from the further tire pressure monitoring device to be received and understood by a human. This may allow for configuration of one or more tire pressure monitoring devices to be transmitted from a single tire pressure monitoring device, which can simplify a procedure where the configuration data of several tire pressure monitoring devices needs to be verified. For example, a need to move between devices can be reduced and/or a tire pressure monitoring device which is positioned so that it is difficult for a human to receive the configuration data signal can be relayed by another of the devices. All the tire pressure monitoring devices may be trusted, so another tire pressure monitoring device can be a trusted intermediary. This does not significantly increase the cost or complexity of the system as a whole because no additional trusted devices are required.

For example, the method may comprise, at a first tire pressure monitoring device, receiving a request for configuration data of a second tire pressure monitoring device; transmitting the request from the first tire pressure monitoring device to the second tire pressure monitoring device; transmitting, from the second tire pressure monitoring device to the first tire pressure monitoring device, a configuration data signal indicative of configuration data stored in the second tire pressure monitoring device; and transmitting, from the second tire pressure monitoring device to a human, the configuration data signal indicative of configuration data stored in the second tire pressure monitoring device.

A second aspect of the present invention provides a data carrier comprising machine readable instructions, which when executed by a processor of a tire pressure monitoring device, cause the tire pressure monitoring device to perform the method according to the first aspect of the present invention. The machine-readable instructions may also cause the tire pressure monitoring device to execute any of the optional features also described. The data carrier may be a non-transitory computer readable medium.

A third aspect of the present invention provides a tire pressure monitoring device configured to perform the method of the first aspect of the present invention.

A fourth aspect of the present invention provides a tire pressure monitoring device comprising a memory for storing configuration data, a light source, and a processor configured to selectively illuminate the light source to transmit a signal indicative of configuration data stored in the memory, the configuration data comprising any of an aircraft wheel location at which the tire pressure monitoring device is intended to be located, and a security code representative of security parameters of the tire pressure monitoring device. For example, any of the methods discussed above to communicate a configuration data signal with a light source can be used.

The tire pressure monitoring device may be configured to communicate with a further tire pressure monitoring device, for example to send a further configuration data request to the further tire pressure monitoring device and/or to receive a further configuration data signal indicative of further configuration data stored in memory of the further tire pressure monitoring device. The tire pressure monitoring device and the further tire pressure monitoring device may comprise respective unique identifiers, for example unique identifiers which are presented in response to appropriate interrogation.

A fifth aspect of the present invention provides an aircraft comprising a tire pressure monitoring device according to the third or fourth aspect of the present invention.

A sixth aspect of the present invention provides a method of communicating configuration data from a network of tire pressure monitoring devices, the method comprising at a first tire pressure monitoring device, receiving a request for configuration data of a second tire pressure monitoring device, transmitting the request from the first tire pressure monitoring device to the second tire pressure monitoring device, transmitting from the second tire pressure monitoring device to the first tire pressure monitoring device a configuration data signal indicative of configuration data stored in the second tire pressure monitoring device, and transmitting from the first tire pressure monitoring device the configuration data signal indicative of configuration data stored in the second tire pressure monitoring device.

Features of aspects of the present invention may be equally applied to other aspects of the present invention, where appropriate.

BRIEF DESCRIPTION OF THE DRAWINGS

Embodiments of the invention will now be described, by way of example only, with reference to the accompanying drawings, in which:

FIGS. 5A to 5G are schematic views illustrating a display of an untrusted device used to verify the signal of FIG. 4;

FIGS. 14A to 14F are schematic views illustrating a display of an untrusted device used to verify the signal of FIG. 13.

DETAILED DESCRIPTION

Figure 1:
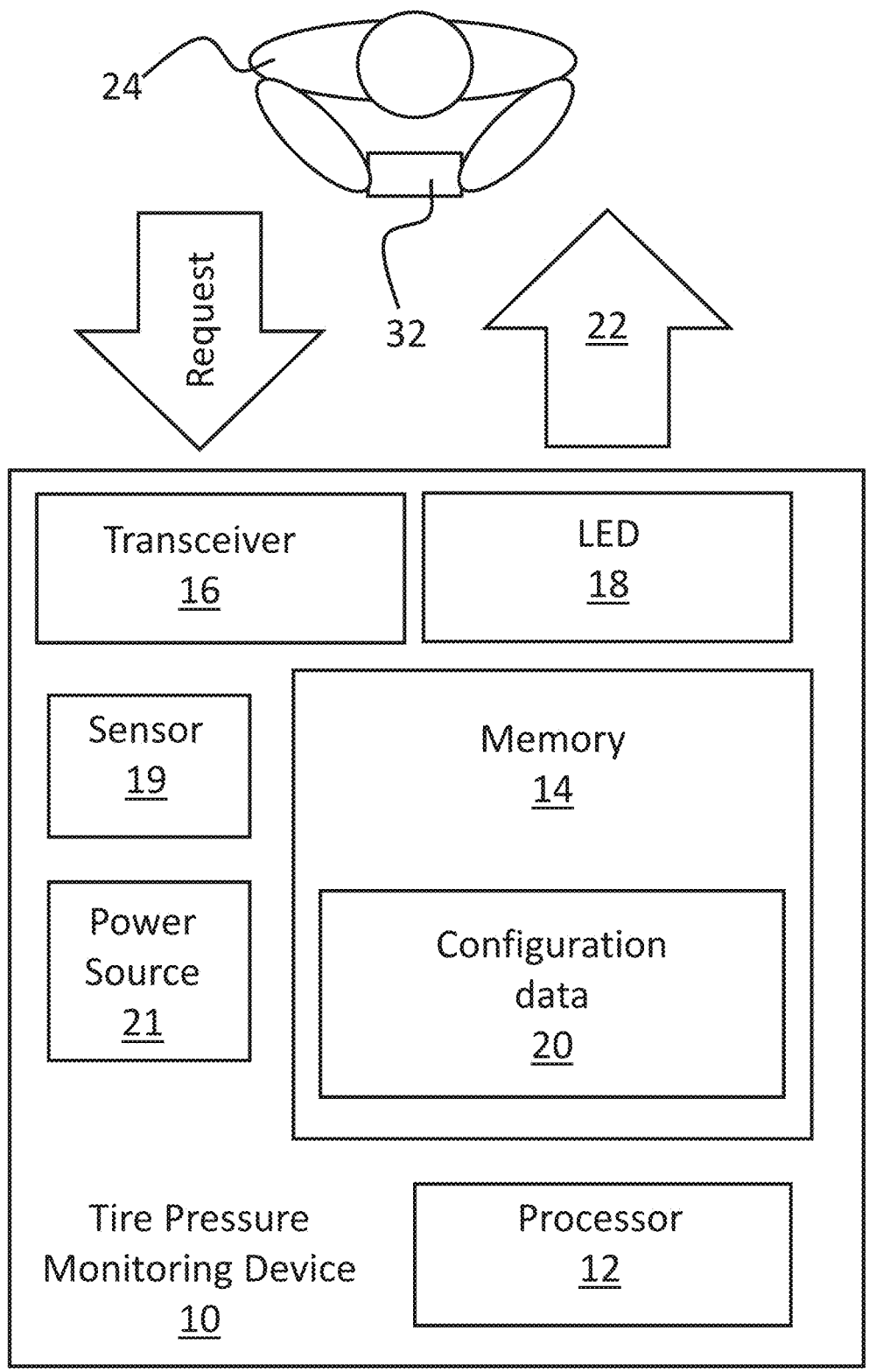
FIG. 1 is a schematic view of a tire pressure monitoring device according to an example.

A tire pressure monitoring device 10 according to an example is shown schematically in FIG. 1. The tire pressure monitoring device 10 comprises a processor 12, a memory 14, a transceiver 16, a visual indicator or display which is an LED 18 in this example, a sensor 19 and a power source 21.

The processor 12 may be any suitable processor including single and multi-core processors, an Application Specific Integrated Circuit (ASIC) or like. The processor 12 is communicatively coupled to the transceiver 16, the LED 18, the memory 20 and the sensor 21.

Memory 14 is a flash memory that stores configuration data 20 and also computer readable instructions for execution by the processor 12 in operation, although it will be appreciated that other types of memory may be used. The configuration data 20 can therefore be updated as required with configuration data. A reference tire pressure is stored in the configuration data 20. Additional data can also be stored in the configuration data 20, for example an aircraft identifier (such as an aircraft Tail identifier) and a wheel position. The configuration data 20 in some examples may further include a security code which is indicative of security parameters generated by the tire pressure monitoring device 10 during configuration. In some examples the security code is a numerical value, which may be generated using a hash function based on the remaining parameters of the configuration data, such as reference tire pressure, aircraft identifier and wheel location, along with any security keys of the tire pressure monitoring device 10. It will be appreciated that the hash value may be truncated to provide a security code of an appropriate length.

Transceiver 16 is an appropriate transceiver capable of receiving a request to confirm the configuration data 20. In this embodiment, the transceiver 16 comprises a short-range radio signal transceiver operating according to the NFC protocol. It will be appreciated, however, that other communication protocols may be used, including, for example, a Bluetooth low energy (BLE) communication protocol. When the transceiver 16 receives a request to confirm the configuration data 20, the processor 12 encodes the configuration data 20 stored in the memory 14 of the tire pressure monitoring device 10, and transmits a signal 22 indicative of the configuration data 20 via the LED 18 to a user 24 observing the tire pressure monitoring device 10. Here the LED 18 is a three-colour LED which is capable of displaying red, blue, and green coloured light. Other examples may use a different number of colours of light than three and/or use other colours than red, blue, and green. In examples herein, the user 24 is a human.

Figure 2:
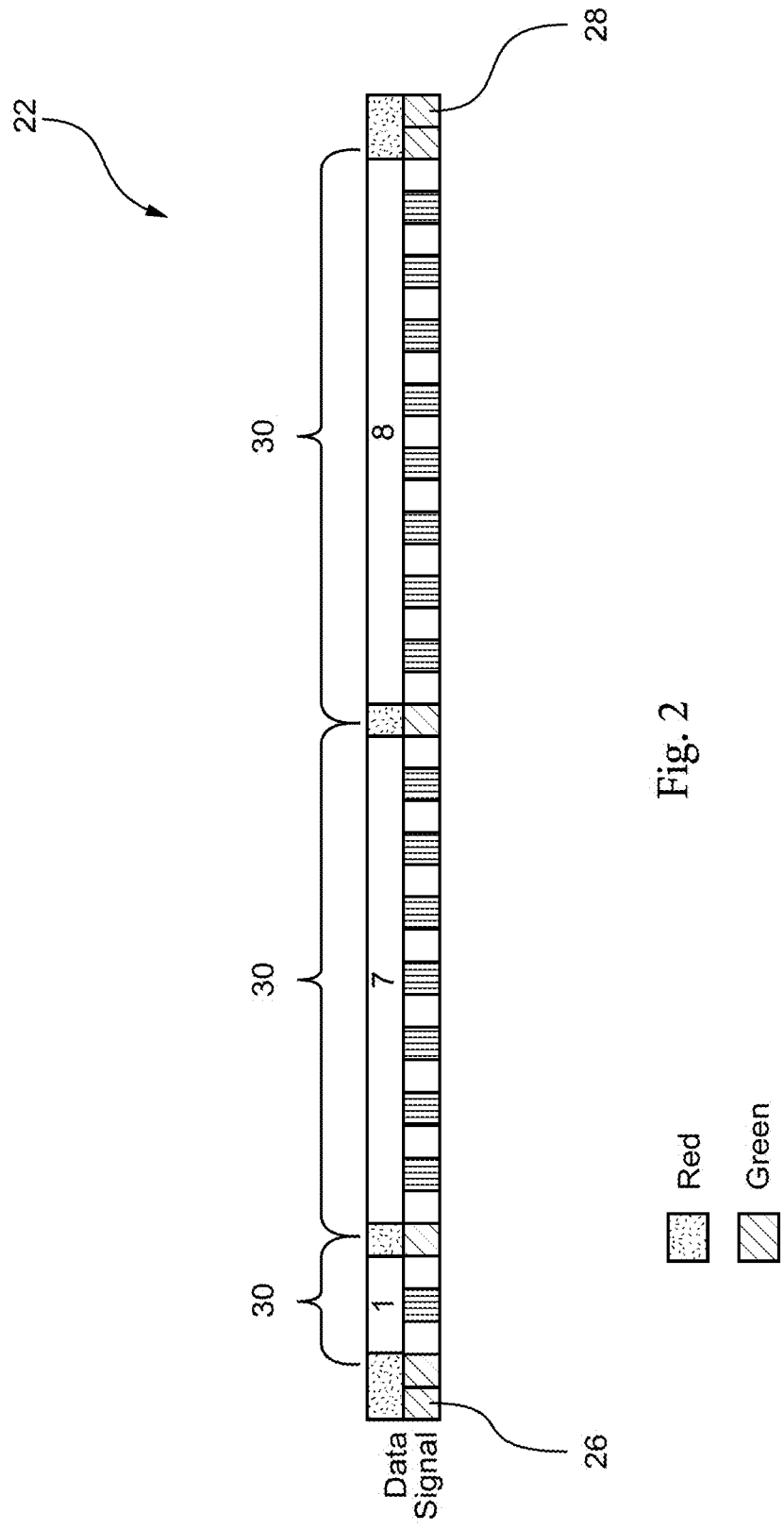
FIG. 2 is a schematic illustration of a first signal indicative of configuration data of a tire pressure monitoring device.

An example of the signal 22 is shown schematically in FIG. 2, where the signal encodes a reference tire pressure stored in configuration data 20 of the tire pressure monitoring device 10. Checking a reference tire pressure has been correctly stored in a tire pressure monitoring device is an important part of setup to confirm correct operation after configuration. It is possible that the configuration data is corrupted and stores an incorrect value, or an incorrect value may have been loaded in error or by a bad actor. The consequences of an incorrect reference tire pressure level in use may be severe, for example making a tire blow-out more likely if the tire is operated at too low a pressure.

As shown in FIG. 2, the reference tire pressure of the tire pressure monitoring device 10 is 178 PSI (1.23 MPa). The signal 22 as a whole has a start signal 26 in the form of a green flash of light from the LED 18, and an end signal 28 in the form of another green flash of light from the LED. The signal 22 is split into a number of sequential sub-signals 30, with each sub-signal 30 being representative of a digit of the reference tire pressure. Each sub-signal 30 has a start signal in the form of a green flash of light from the LED 18, an end signal in the form of another green flash of light from the LED 18, and an intermediate signal in the form of a flash/a number of red flashes of light from the LED 18.

As shown in FIG. 2, the start of the first sub-signal 30 is coincident with the start signal 26 of the overall signal 22, and the end of the last sub-signal 30 is coincident with the end signal 28 of the overall signal 22, such that the start 26 and end 28 signals resemble prolonged flashes of the LED 18. Furthermore, a flash of the LED to indicate the end of the first sub-signal 30 also functions as a start signal of the second sub-signal.

In the signal 22, the intermediate signals of each sub-signal 30 encode and are indicative of the reference tire pressure. For example, in the first sub-signal 30, there is one flash of red light from the LED 18, indicating that the first digit of the reference tire pressure is the number "1". In the second sub-signal 30, there are seven flashes of red light from the LED 18, indicating that the second digit of the reference tire pressure is the number "7". In the third sub-signal 30, there are eight flashes of red light from the LED 18, indicating that the third digit of the reference tire pressure is the number "8". Thus, the LED 18 can be used to output the signal 22 to the user 24, with the signal 22 being in a manner that is easily receivable and understandable by the user 24. The duration of each flash can be chosen depending on the length of the overall sequence and the length of flash needed to be clear to the user 24, and in the example of FIG. 2 each flash is 0.5 s long. In other examples, the colour of the flashes can be different, for example with a different colour of light being used for each digit of the reference tire pressure so that a first colour indicates "units", a second colour indicates "tens" and a third colour indicates "hundreds".

Once the signal 22 is received by the user 24, the user 24 may take appropriate action to confirm that the reference tire pressure stored in the memory 14 is correct, or may take appropriate remedial action if the reference tire pressure is incorrect. In some examples, the user 24 uses an untrusted device 32, for example a mobile phone or tablet computer running an application, to verify the configuration data 20. As the user 24 can be taken to be a trusted source, and the tire pressure monitoring device 10 is itself a trusted source, the untrusted device 32 can be used to input the user's verification of the configuration data 20. For example, the untrusted device 32 can display a prompt with an expected reference pressure. The verification can be trusted because it occurs between the user 24 (who is trusted) and tire pressure monitoring device 10 (which is trusted because of its certification to a particular DAL).

Whilst the tire pressure monitoring device 10 is depicted in FIG. 1 as comprising an LED 18, and the signal 22 comprises flashes of the LED 18, it will be appreciated that in another embodiment the tire pressure monitoring device 10 may comprise a transducer in the form of a beeper or speaker, and that that the signal 22 may instead comprise audible noises instead of flashes of light. In other examples the signal may additionally or alternatively take the form of any of a signal displayed on an LCD screen in the form of flashing lights, pictures, or text. Similarly, other examples may display flashing lights, pictures or text on an LED matrix display.

Figure 3:
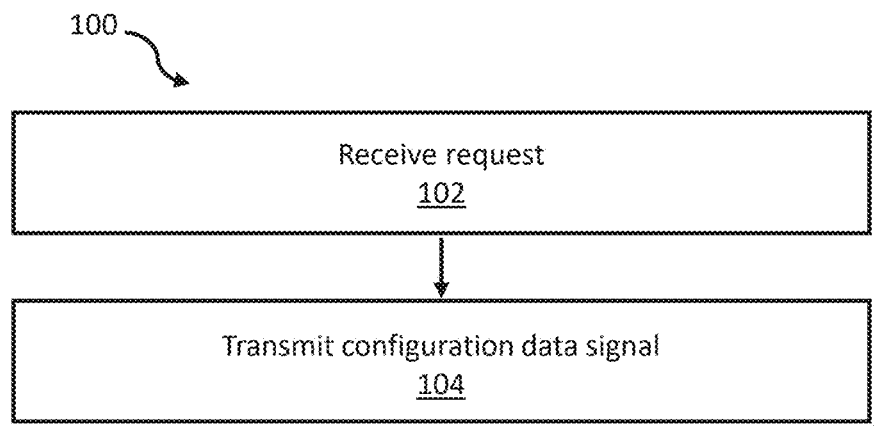
FIG. 3 is a schematic view illustrating a first example method of communicating configuration data of a tire pressure monitoring device.

A method 100 of operating the tire pressure monitoring device 10 is shown schematically in FIG. 3. The method 100 comprises receiving 102 a request to confirm the configuration data 20 of the tire pressure monitoring device 10 at the transceiver 16. Responsive to the request, a configuration data signal 22 encoding the configuration data 20 is transmitted 104 by the LED 18.

Figure 4:
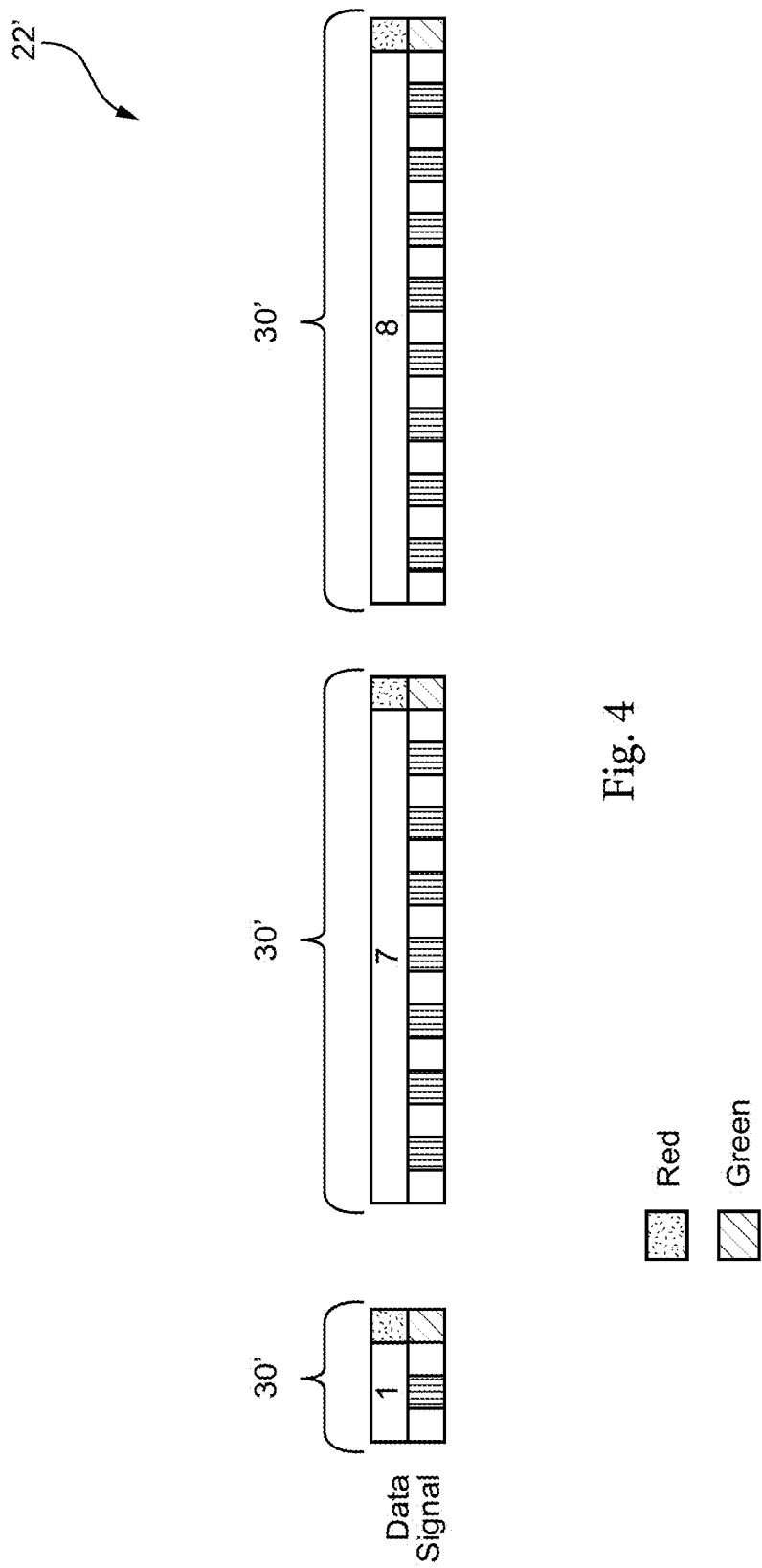
FIG. 4 is a schematic illustration of a second signal indicative of configuration data of a tire pressure monitoring device.

In another example, a signal 22' takes a different form, as illustrated schematically in FIG. 4. In this instance, sub-signals 30' are discrete signals separate from one another. This allow the signal 22' to be split such that each sub-signal 30' is easily recognisable and verifiable by a user. In this example, an untrusted device 32 may communicate with a tire pressure monitoring device 10, and the tire pressure monitoring device 10 may cause a sequence of discrete sub-signals 30' to be provided in response to instructions received over the receiver from the untrusted device.

For example, in response to a request from the user 24, submitted via the untrusted device 32, to check or determine the configuration data stored in a tire pressure monitoring device 10, a first message indicating what form a first sub-signal 30' will take is displayed on the untrusted device 32. This first message is shown schematically in FIG. 5A. It provides data of what the reference pressure is expected to be, in this case 178 PSI (equivalent to 1.23 MPa, or 12.3 BAR), and of what signal is expected to be provided by the tire pressure monitoring device 10. In this case the signal is one red flash, indicating the digit 1, and one green flash, indicating the end of a sub-signal for that digit. The user 24 interacts with a user interface element 52 on the untrusted device 32 to cause the first sub-signal 30' to be transmitted by the LED 18. In this case, the user interface element is a button displayed on a touch screen of the untrusted device 32 which displays the text "go". In response to activation of the user interface element 52, such as by a tap, the untrusted device 32 transmits a signal to the tire pressure monitoring device 10 to cause it to transmit or communicate the first sub-signal 30'. Meanwhile, the untrusted device 32 displays a first verification message, allowing the user 24 to indicate that the first sub-signal 30' has been received and understood by a user interface element 54, as shown schematically in FIG. 5B. A message is also provided to remind the user what they should have observed, in this case one red flash.

Figure 5A:
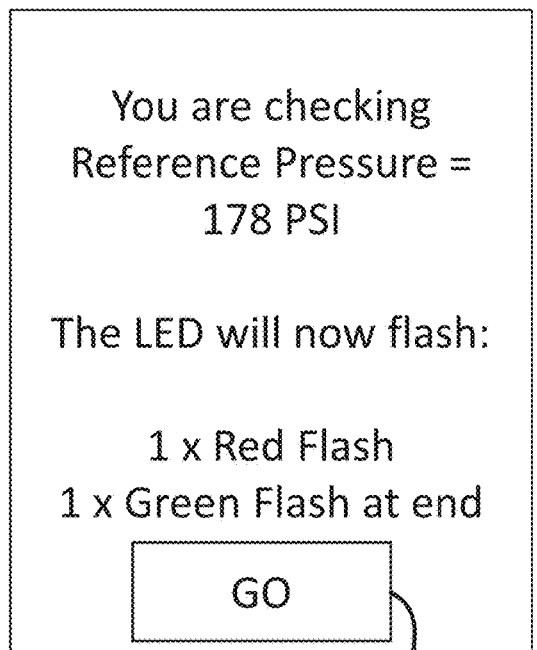
Figure 5B:
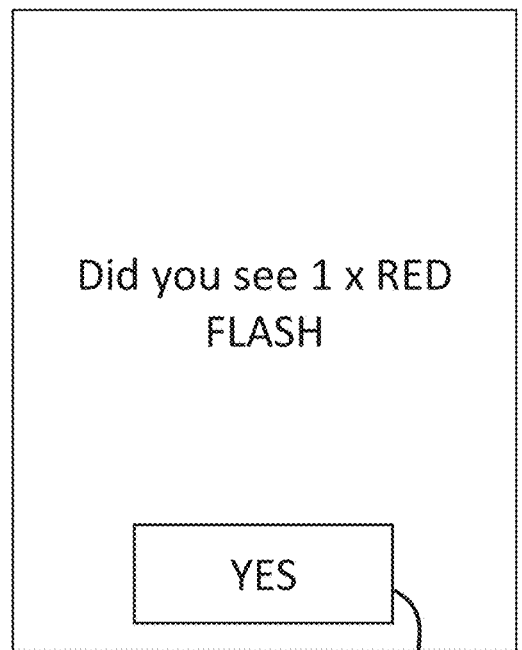
Figure 5C:
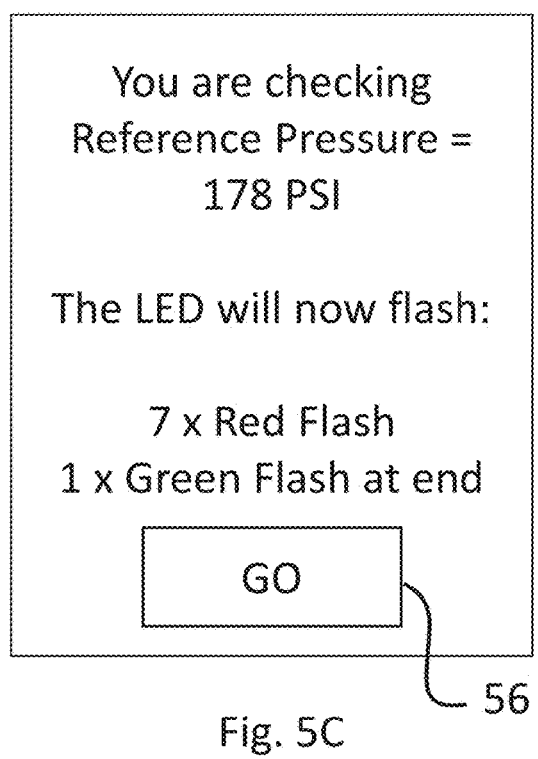
Figure 5D:
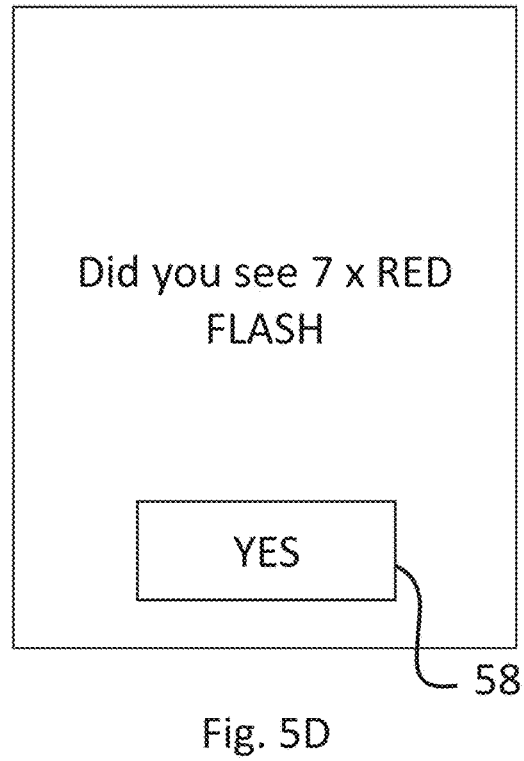

When the user interface element 54 is activated, such as by a tap on a touch screen of the untrusted device 32, a second message indicating what form a second sub-signal 30' will take is displayed on the untrusted device, as shown schematically in FIG. 5C. Again, this states the reference pressure and what the next signal is expected to be, in this case seven red flashes for the digit 7 followed by a green flash to indicate the end of the sub-signal. A user interface element 56 is provided which, when selected by the user, causes the tire pressure monitoring device 10 to transmit or communicate the second sub-signal 30', in the same way as described above for FIG. 5A. Once the second sub-signal 30' has been transmitted, a second verification message is displayed on the untrusted device 32, shown schematically in FIG. 5D. A user can confirm the second sub-signal 30' has been observed by interacting with a user interface element 58, in the same as described above for FIG. 5B.

Next, a third message indicating what form a third sub-signal 30' will take is displayed on the untrusted device 32, as shown schematically in FIG. 5E. Again, this includes the reference pressure and an indication that the third sub-signal 30' will comprise eight red flashes, corresponding to the digit 8. As discussed above with reference to FIG. 5A, the user interacts with a user interface element 60 that causes the third sub-signal 30' to be transmitted or communicated by the LED 18. Once the third sub-signal 30' has been transmitted, a third verification message 62 is displayed on the untrusted device, allowing the user to indicate that the third sub-signal 30' has been received and understood, as shown schematically in FIG. 5F.

Finally, a confirmation message is displayed on the untrusted device 32 once all sub-signals 30' have been received, as shown schematically in FIG. 5G. Although described here with reference to three sub-signals, it will be recognised that the number of sub-signals may vary depending on the configuration data requested. Other configuration data than pressure may be indicated and alphabetical data as well as numerical data can be communicated. Other encoding schemes can also be used, for example Morse code, but a direct correlation between a numerical value and the number of flashes has the benefit of requiring no specific user knowledge and potentially more reliable to recognise.

As discussed above with reference to FIGS. 5A to 5G, only a single user interface element is displayed to allow the user to provide positive confirmation. A timer may be associated with each screen after which a negative result may be assumed and the process terminates without confirmation. Alternatively a specific negative option, to cancel the process or to indicate that the observed sequence did not match that which was expected, can be included in the user interface to allow a user to indicate that the data has not been confirmed.

This process allows an untrusted device to guide a user through the process because if the untrusted device attempts to mislead the user as to the configured pressure, the user, who is trusted, will notice that the signal from the tire pressure monitoring device does not match what is expected. Similarly, the use of a simple encoding where the number of flashes matches the digit, a user can identify potential false guidance on the untrusted device. If any of the observed sub-signals 30' are noted by the user as not being received or understood, a user interface element on the untrusted device 32 may be used to indicate this, and the user 24 may be required to repeat a configuration of the tire pressure monitoring device 10 and/or conduct further analysis and/or replace the tire pressure monitoring device 10.

The process enables the user to identify any of incorrectly entered configurations, a faulty tire pressure monitoring device 10, a faulty untrusted device 32, and a malicious application running on the untrusted device 32.

Figure 6:
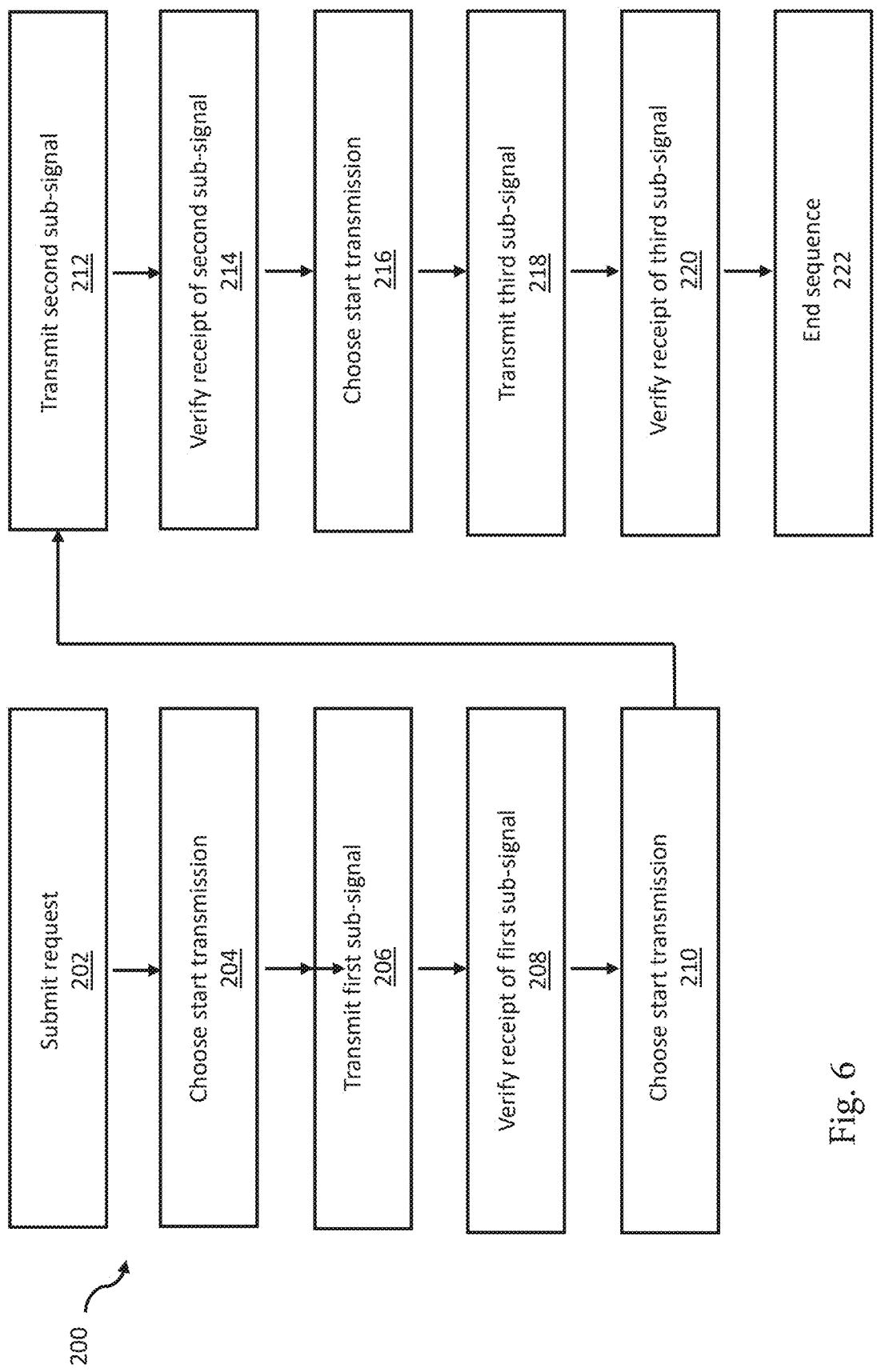
FIG. 6 is a schematic view illustrating a second example method of communicating configuration data of a tire pressure monitoring device.

A further example method 200 of operating a system comprising the tire pressure monitoring device 10 and the untrusted device 32 is shown schematically in FIG. 6, with the signal 22' taking the form depicted in FIG. 4.

The method 200 comprises submitting, at block 202, a request for configuration data from the tire pressure monitoring device using the untrusted device 32, by interacting with the user interface of the untrusted device 32. In response to the request, a start transmission option is chosen, at block 204, by interacting with the user interface of the untrusted device. The first sub-signal 30' is transmitted at block 206, and a user is required to verify at block 208 that the first sub-signal 30' has been correctly received by interacting with the user interface of the untrusted device 32. A start transmission option is chosen 210 for the second sub-signal 30', again interaction with a user interface of the untrusted device 32. The second sub-signal 30' is transmitted at block 212, and a user is required to verify at block 214 that the second sub-signal 30' has been correctly received by interacting with the user interface of the untrusted device 32. A start transmission option is then chosen at block 216 for the third sub-signal 30', again using a user interface of the untrusted device 32. The third sub-signal 30' is transmitted at block 218, and a user is required to verify at block 220 that the third sub-signal 30' has been correctly received, using the user interface of the untrusted device 32. The transmission sequence is then ended 222.

In such a manner, the method 200 may transmit the sub-signals 30' in a stepwise manner, with verification of each sub-signal 30' being required before a next sub-signal in the sequence is transmitted. This can improve clarity of the signal for the user, and provide for easier verification of the configuration data in use while also reducing user error because there is less reliance on a user's memory.

Figure 7:
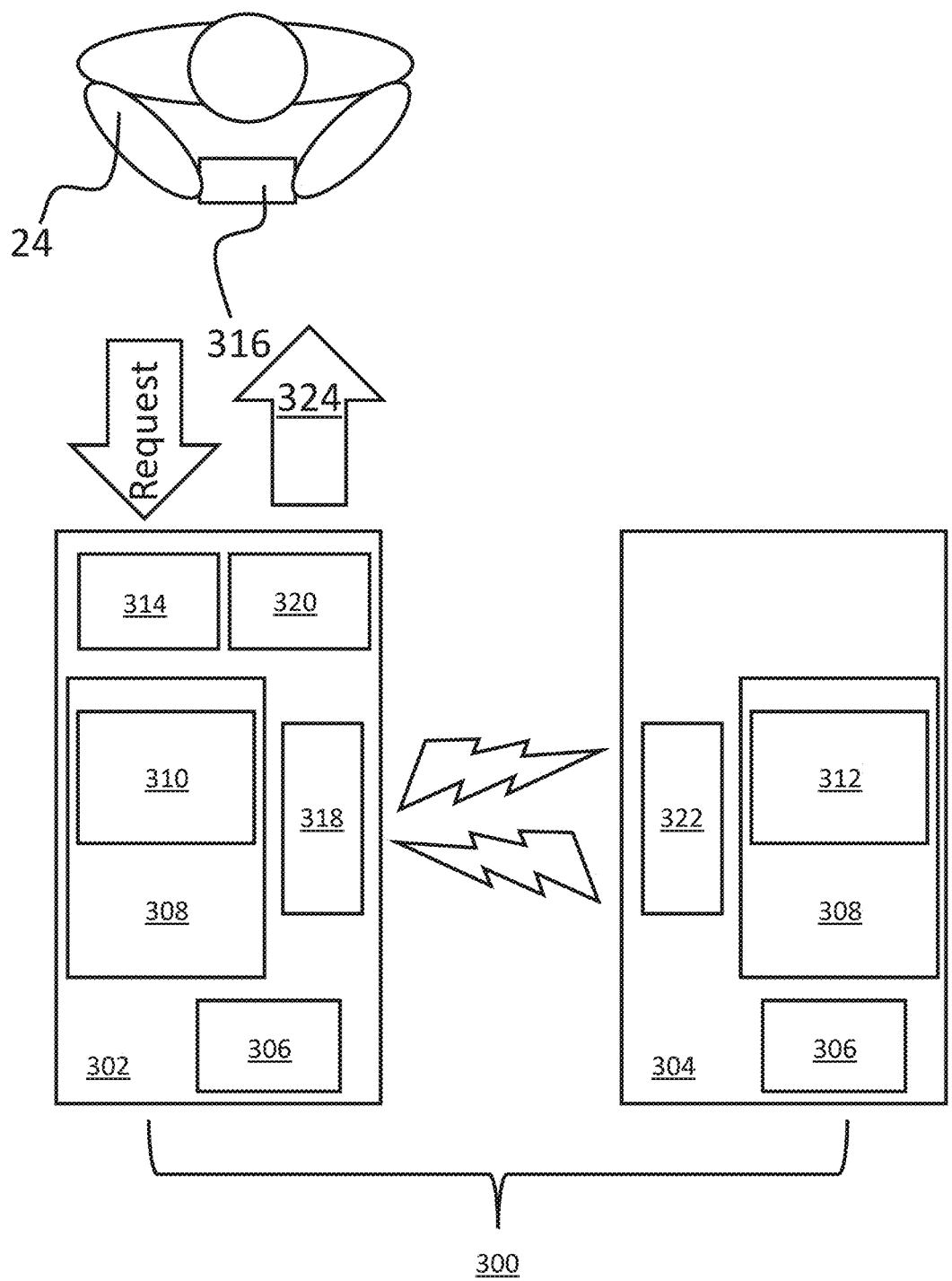
FIG. 7 is a schematic view of a first network of tire pressure monitoring devices according to an example.

An example of a network 300 of a first 302 and a second 304 tire pressure monitoring devices is shown schematically in FIG. 7. The first 302 and second 304 tire pressure monitoring devices have generally the same structure as the tire pressure monitoring device 10 of FIG. 1, but with differences that will now be described.

Each of the first 302 and second 304 tire pressure monitoring devices has a processor 306, and a memory 308. The processor 306 may be any conventional processor, and the memory 308 stores respective configuration data 310,312. The first tire pressure monitoring device 302 has a receiver 314 for communicating with an untrusted device 316, a transceiver 318 for communicating with the second tire pressure monitoring device 304, and a visual indicator in the form of an LED 320. The LED 320 in this example is an LED which is capable of displaying both red, blue, and green coloured light as discussed above with reference to FIG. 1, other examples may use other types of visual indicator and other colours of light. The second tire pressure monitoring device 304 has a transceiver 322 for communicating with the transceiver 318 of the first tire pressure monitoring device 302. Two devices are shown here for clarity, but it will be appreciated that there will typically be more than two devices, with each tire having an associated tire pressure monitoring device.

Figure 8:
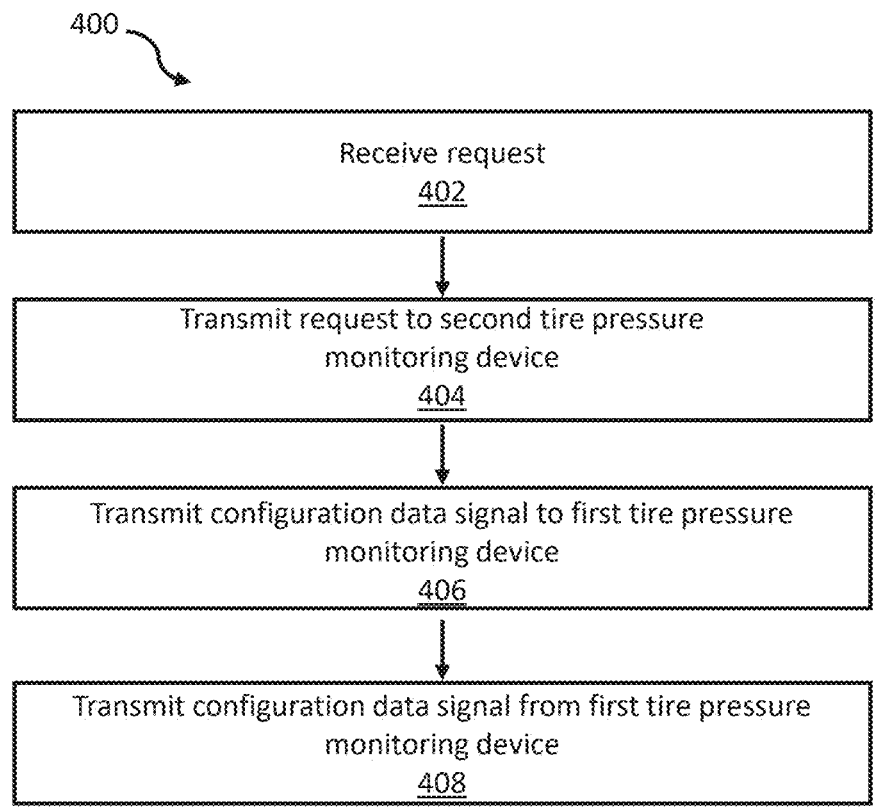
FIG. 8 is a schematic view illustrating a method of operating the network of FIG. 7.

A method 400 of operating the network 300 is shown schematically in FIG. 8. The method 400 comprises receiving, at block 402, at the receiver 314 of the first tire pressure monitoring device 302, a request to confirm the configuration data 312 stored in the memory 308 of the second tire pressure monitoring device 304. The first tire pressure monitoring device 302 uses its transceiver 318 to transmit, at block 404, the request to the transceiver 322 of the second tire pressure monitoring device 304. In response to receipt of the request, the processor 306 of the second tire pressure monitoring device 304 encodes the configuration data 312 stored in the memory 308 of the second tire pressure monitoring device 304, and the processor 306 uses the transceiver 322 of the second tire pressure monitoring device 304 to transmit, at block 406, a signal representative of the configuration data 312 to the transceiver 318 of the first tire pressure monitoring device 302. The LED 320 of the first tire pressure monitoring device 302 then transmits 408 a signal 324 representative of the configuration data 312 stored in the memory 308 of the second tire pressure monitoring device 304 in manner such that the signal 324 can be received and understood by a user 24.

Thus the configuration data 312 stored in the memory 308 of the second tire pressure monitoring device 304 can be requested at and subsequently displayed by the first tire pressure monitoring device 302. This can provide for easier and simpler operation in use, as a user can request configuration data from multiple tire pressure monitoring devices at a single tire pressure monitoring device. This can also reduce the time taken to obtain configuration data, as a user does not need to move from device to device in order to request and obtain configuration data. This can also enable an arrangement where the second tire pressure monitoring device 304 is hidden from view, for example beneath a hubcap or other components, and/or where the second tire pressure monitoring device 304 is located internally within a wheel/tire.

In some examples, the signal communicated to the user may include additional elements to indicate which tire pressure monitoring device the configuration data applies to, for example by encoding a wheel position before or after the reference pressure. For example, where the second tire pressure monitoring device 304 is at a wheel allocated number "3", the LED 320 of the first tire pressure monitoring device 302 may flash three times to indicate that it is the configuration data of the tire pressure monitoring device of wheel "3" that is transmitted as the signal 324.

Figure 9:
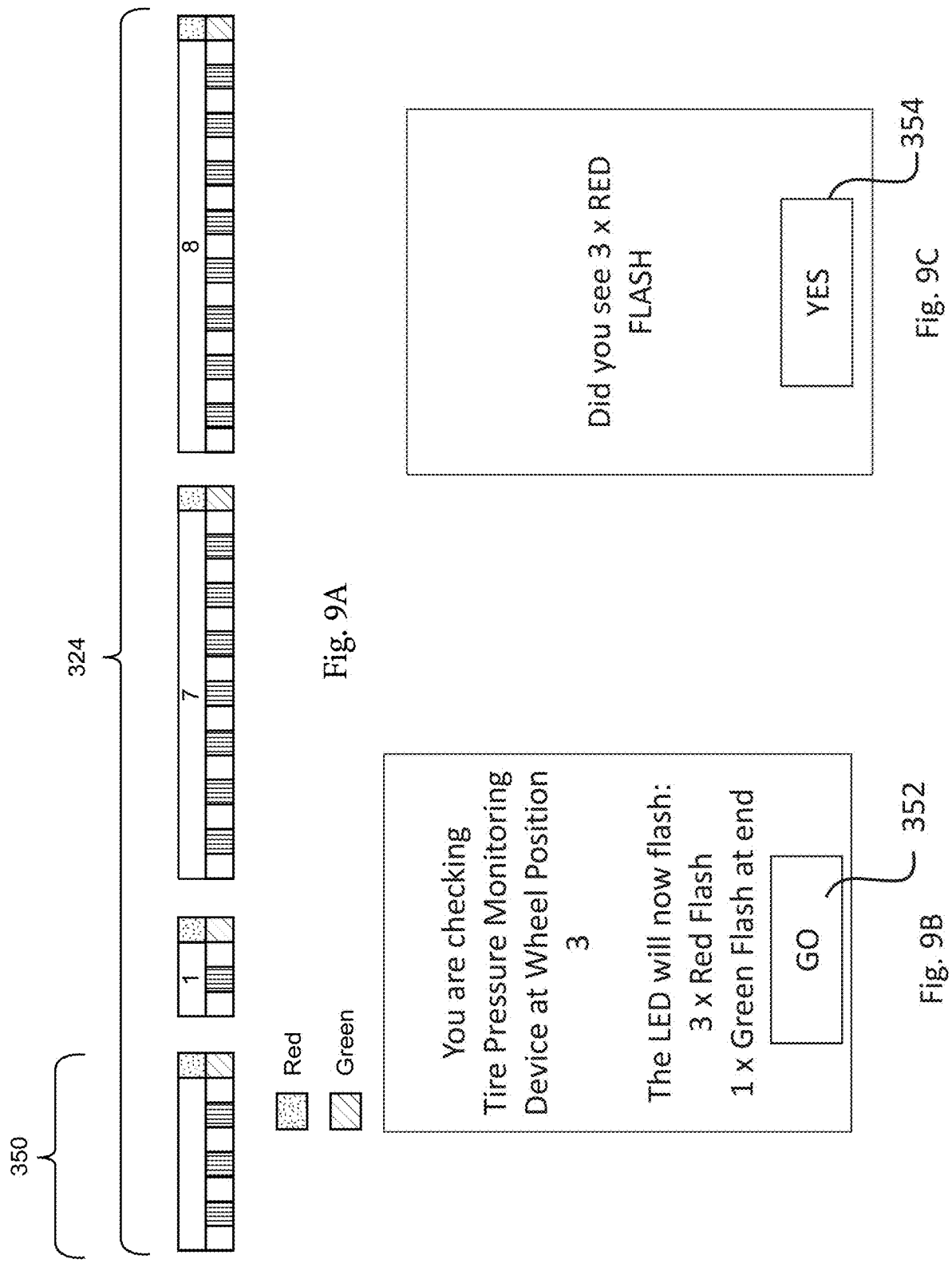
FIG. 9A is a schematic illustration of a third signal indicative of configuration data of a tire pressure monitoring device.
FIGS. 9B and 9C are schematic views illustrating a display of an untrusted device used to verify a location indication in the signal of FIG. 9A.

FIG. 9A depicts an example of a signal 324 including a location indication 350 of a tire pressure monitoring device. The location indication is an example of additional information as described above. An associated indication message and confirmation message to be displayed on the untrusted device 316 are depicted in FIGS. 9B and 9C, respectively. The indication message of FIG. 9B is displayed as a message which indicates the number of red flashes corresponding to the tire pressure monitoring device location being checked, followed by a green flash to indicate end of transmission expected be observed by the user on the LED 320. In the example of FIG. 9B, the wheel location is "3" and the message indicates that three red flashes for the location indication 350 are expected. In response to user interaction with a user interface element 352 on the untrusted device 316, the location indication 350 is communicated or transmitted by causing the LED to provide three red flashes followed by a green flash.

Subsequent to communicating the location indication 350, the confirmation message of FIG. 9C is displayed by the untrusted device 316 which asks the user 24 to confirm that they have correctly received the location indication 350. Confirmation is provided via interaction with a user interface element 354 on the untrusted device 316. Once confirmation has taken place, an initial message similar to that of FIG. 5A may be displayed on the untrusted device 316, and the remainder of the signal 324 may take a form similar to that of the signal 22' of FIG. 4, with the user continuing to work through the method of FIG. 6 to confirm the configuration data.

In some examples, a unique identifier may be used to identify one or both of the first 302 and second 304 tire pressure monitoring devices and used to indicate which device(s) should communicate stored configuration information. The unique identifier can be determined by an untrusted device or entered manually into the untrusted device. For example, the unique identifier can be determined by the untrusted device by: Near Field Communication (NFC) or Radio Frequency Identification (RFID) interrogation of the tire pressure monitoring device; by reading a printed indication of the serial number, such as a barcode (one- or two-dimensional) using a camera, reading characters of a serial number using Optical Character Recognition (OCR) using a camera or the like. Manual entry may involve entering the unique identifier as printed on a device or instead providing an aircraft tail identifier and an associated wheel position for which it is desired to confirm the configuration data.

In examples previously described, only two colours of light, red and green, have been utilised in the signals 22,22',324,350. It will be appreciated that signals where three or more colours of light are utilised are also envisaged, for example where red, blue, and green are utilised.

Figure 11:
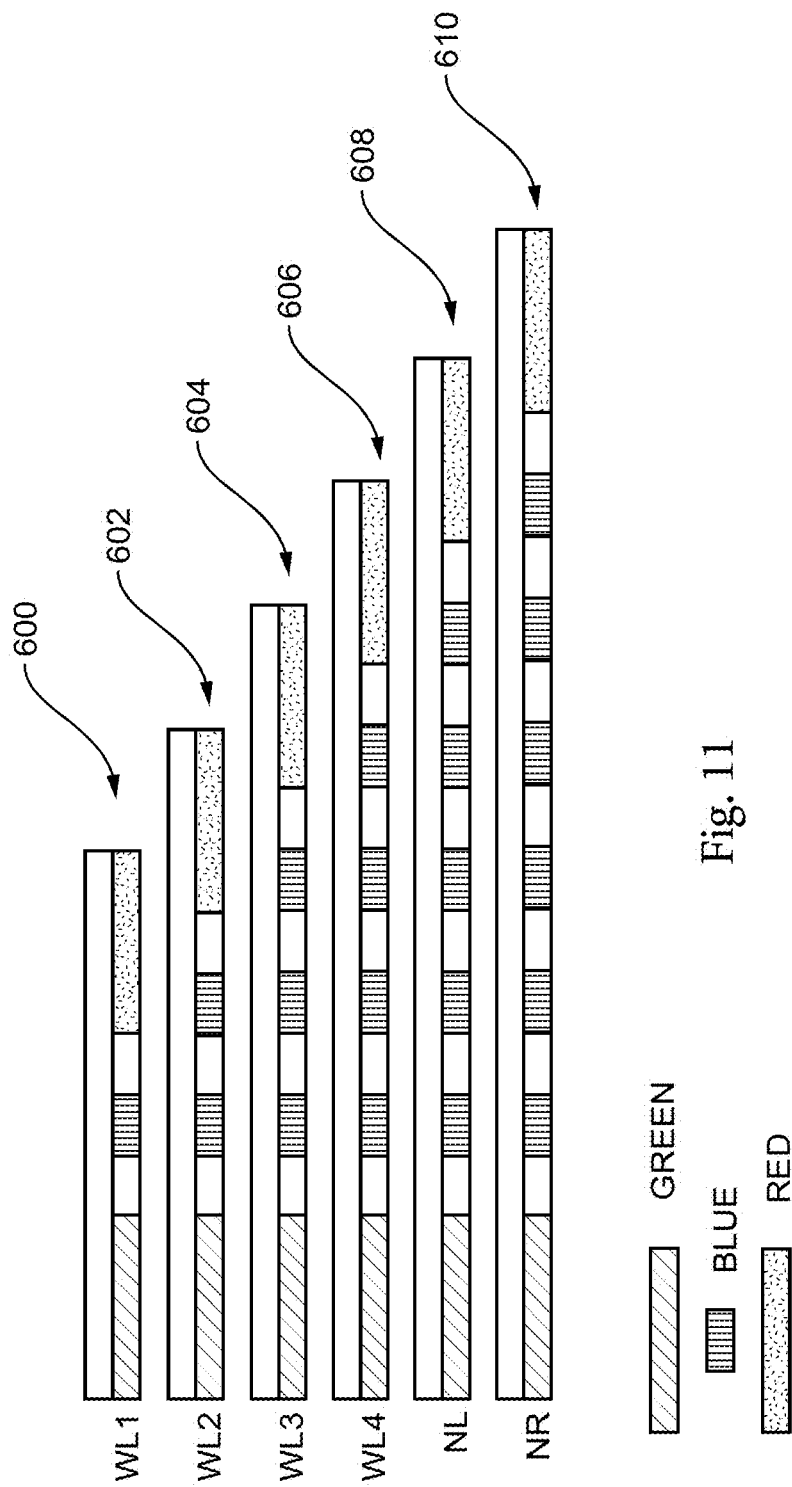
FIG. 11 is a schematic illustration of a fourth signal indicative of configuration data of a tire pressure monitoring device.

Illustrative signals 600,602,604,606,608,610 that utilise red, blue, and green to indicate device location are shown in FIG. 11. Here, for each device location, a green flash indicates start of the signal 600,602,604,606,608,610, a red flash indicates end of the signal 600,602,604,606,608,610, and blue flashes intermediate the green and red flashes indicate device location. In the example of FIG. 11, six tire pressure monitoring devices 10 are installed on an aircraft, with one at each of the left nose wheel, the right nose wheel, a first landing gear wheel, a second landing gear wheel, a third landing gear wheel, and a fourth landing gear wheel, and a different number of blue flashes is used to distinctly identify each of those locations.

In the example of FIG. 5A, the user interface of the untrusted device 32 displays to the user 24 the expected flash sequence. In alternative examples, an aircraft maintenance manual (AMM) task card may provide to the user 24 a list of tire pressure monitoring device locations, e.g., nose left, nose right, and so on, along with an associated expected flash sequence for the LED 18 which would correctly indicate the associated tire pressure monitoring device location. Such an AMM task card may provide numerical values for expected flashes and/or may provide pictorial representations of the expected flashes such as seen in FIG. 11. It will be appreciated that the AMM task card may be provided separately to the user 24 as a physical task card, or, for example, as a display on a separate electronic device to the untrusted device 32.

Figure 12:
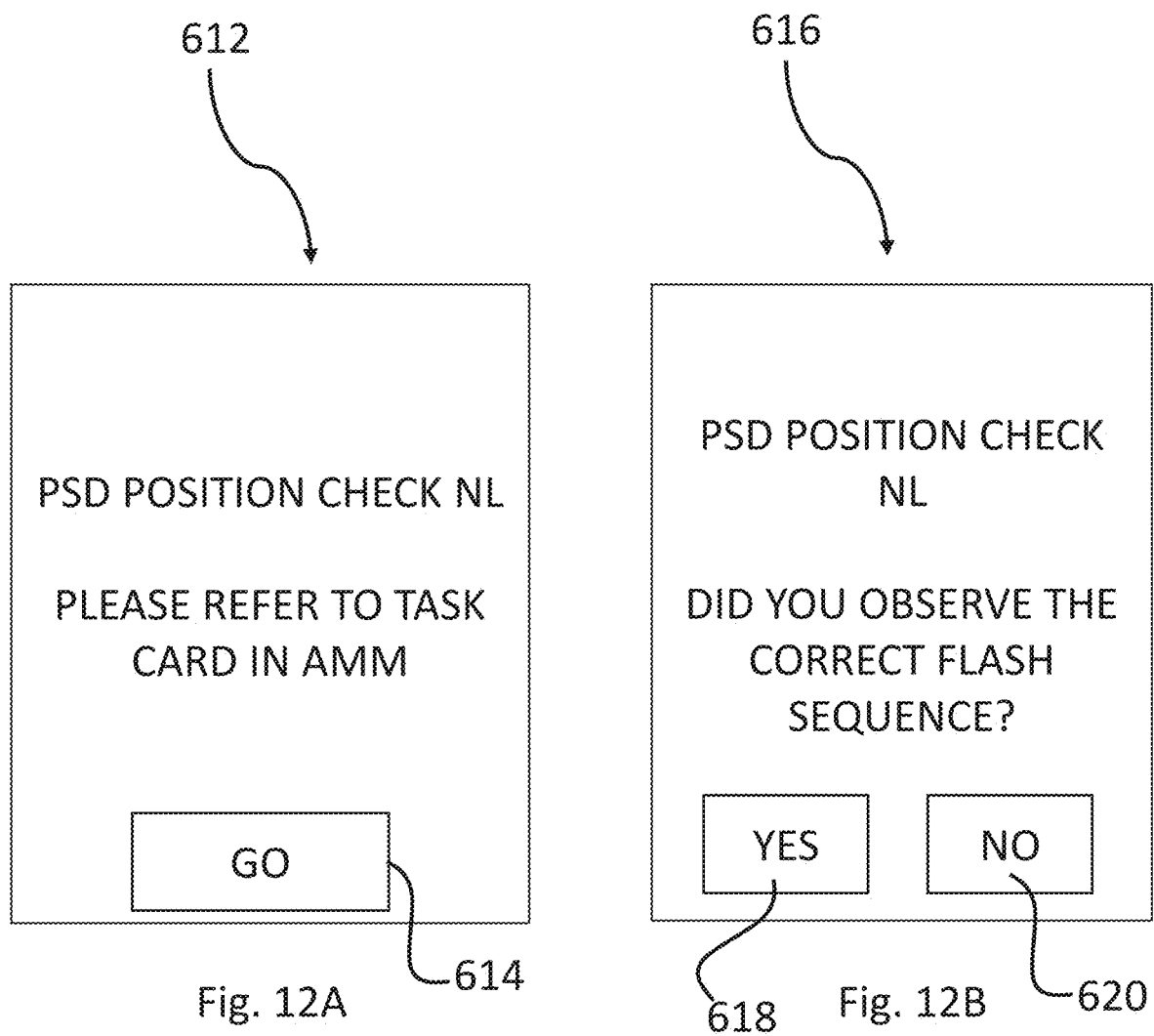
FIGS. 12A and 12B are schematic views illustrating a display of an untrusted device used to verify the signal of FIG. 11.

When checking the location stored in configuration data 20 of a tire pressure monitoring device 10, the user 24 submits a request for the tire pressure monitoring device 10 to display the stored location, using a user interface of the untrusted device 32. The stored location is then displayed by the LED 18. The untrusted device 32 does not tell the tire pressure monitoring device 10 which sequence to flash, but rather provides an instruction for the tire pressure monitoring device 10 to flash its sequence indicative of the stored location. An exemplary user interface 612 for starting the check is shown in FIG. 12A, with the user 24 interacting with user interface element 614 to start the check. An exemplary user interface 616 for a user 24 to verify the signal 600,602,604,606,608,610 is shown in FIG. 12B, with the user 24 interacting with user interface elements 618,620 to provide an input indicative of whether the signal 600,602,604,606,608,610 is verified or not. If the signal 600,602,604,606,608,610, here indicative of stored location of the tire pressure monitoring device 10, is not verified, then the configuration data 20 needs to be reloaded.

As the user 24 can be taken to be a trusted source, and the tire pressure monitoring device 10 is itself a trusted source, the untrusted device 32 can be used to input the user's verification of the configuration data 20. The verification can be trusted because it occurs between the user 24 (who is trusted) and tire pressure monitoring device 10 (which is trusted because of its certification to a particular DAL).

Figure 13:
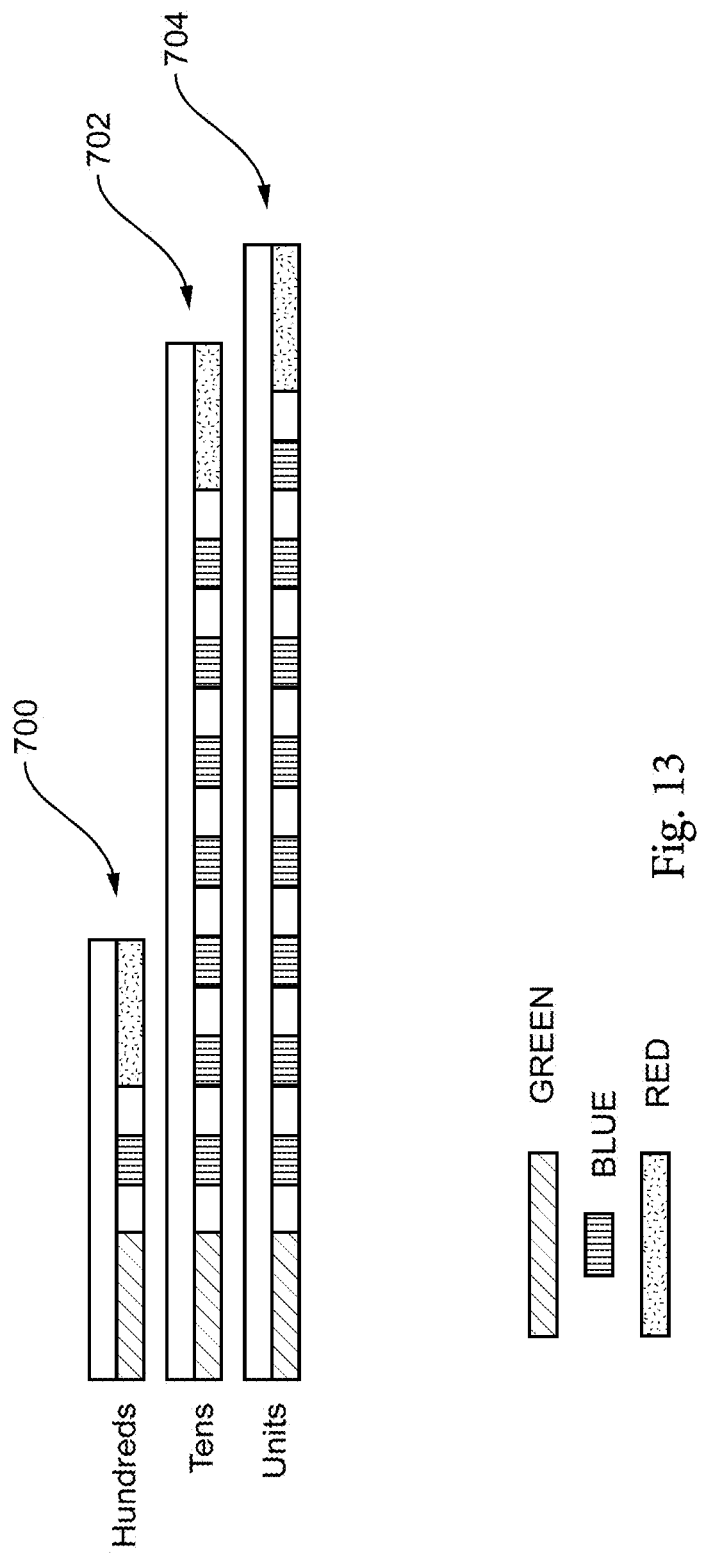
FIG. 13 is a schematic illustration of a third signal indicative of configuration data of a tire pressure monitoring device.

Similar to the signals 600,602,604,606,608,610 of FIG. 11 that indicate device location, signals 700,702,704 that use three colours of light, i.e., red, blue, and green, to indicate reference pressure are shown in FIG. 13. As illustrated in FIG. 13, the reference pressure to be communicated is 178 PSI, and each signal 700,702,704 is used to communicate one digit of the reference pressure. The first signal 700 comprises one green flash, followed by one blue flash, followed by one red flash, to communicate that the "hundreds" digit is "1". The second signal 702 comprises one green flash, followed by seven blue flashes, followed by one red flash, to communicate that the "tens" digit is "7". The third signal 704 comprises one green flash, followed by eight blue flashes, followed by one red flash, to communicate that the "units" digit is "8".

An AMM task card can also be used when checking the reference pressure stored in the tire pressure monitoring device 10. For example, the AMM task card may provide an expected flash sequence for each signal 700,702,704 so that a user can verify the flash sequence seen relative to the AMM task card. In some examples, the user 24 may be required to complete a portion of the AMM task card to complete the expected flash sequence for the reference pressure based on the location of the tire pressure monitoring device 10 that is being checked.

Figure 14A:
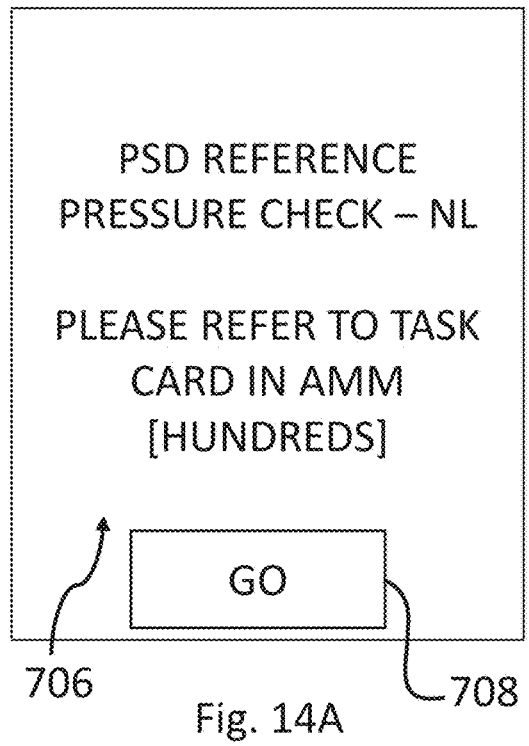
Figure 14B:
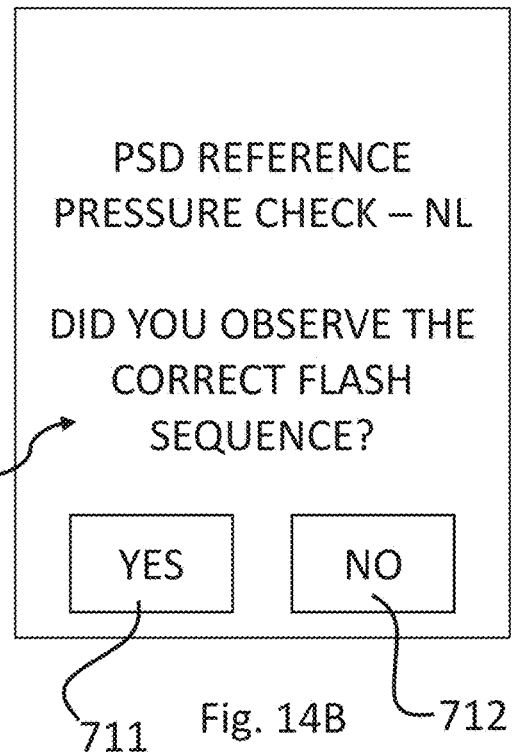

When checking the stored reference pressure of the tire pressure monitoring device 10 using the AMM task card, the user 24 submits a request for the tire pressure monitoring device 10 to display the stored reference pressure, via the LED 18, using a user interface of the untrusted device 32. The untrusted device 32 does not tell the tire pressure monitoring device 10 which sequence to flash, but rather provides an instruction for the tire pressure monitoring device 10 to flash its sequence indicative of the stored reference pressure. An exemplary user interface 706 for starting the check for the "hundreds" digit is shown in FIG. 14A, with the user 24 interacting with user interface element 708 to start the check for the "hundreds" digit. An exemplary user interface 710 for a user 24 to verify the signal 700 for the "hundreds" digit is shown in FIG. 14B, with the user 24 interacting with user interface elements 711,712 to indicate whether the signal 700 is verified, i.e., that seen on the AMM task card, or not.

Figure 14C:
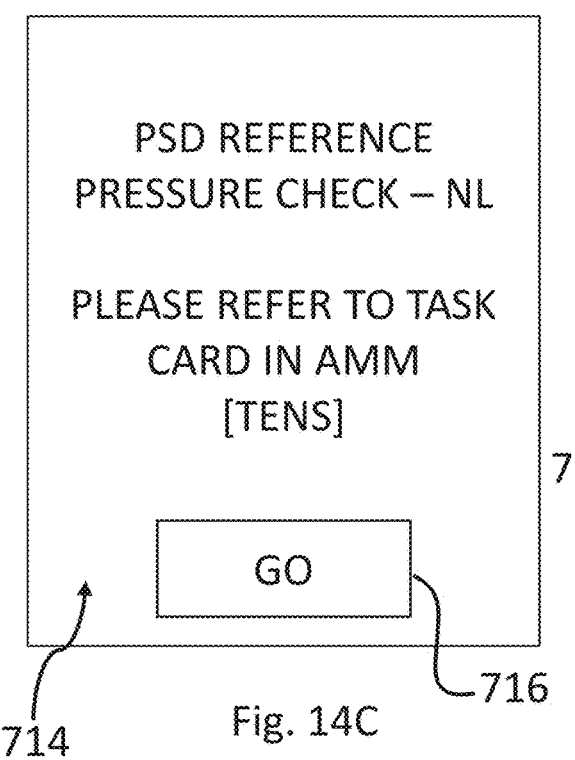
Figure 14D:
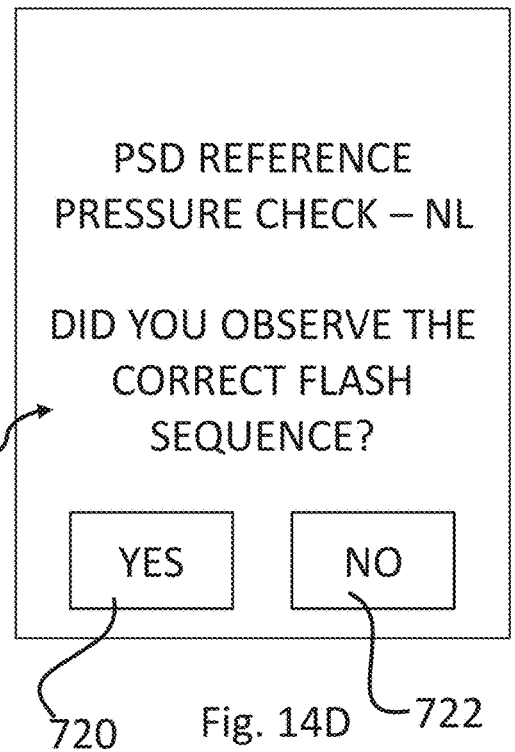

Similarly, an exemplary user interface 714 for starting the check for the "tens" digit is shown in FIG. 14C, with the user 24 interacting with user interface element 716 to start the check for the "tens" digit. An exemplary user interface 718 for a user 24 to verify the signal 702 for the "tens" digit is shown in FIG. 14D, with the user 24 interacting with user interface elements 720,722 to indicate whether the signal 702 is verified or not. An exemplary user interface 724 for starting the check for the "units" digit is shown in FIG. 14E, with the user 24 interacting with user interface element 726 to start the check for the "units" digit. An exemplary user interface 728 for a user to verify the signal 704 for the "units" digit is shown in FIG. 14F, with the user 24 interacting with user interface elements 730,732 to indicate whether the signal 704 is verified or not.

A further parameter which may be communicated to the user 24 by appropriate flashing of an LED of a tire pressure monitoring device is the security code. As previously discussed, in some examples the security code is a numerical value, which may be generated using a hash function based on the remaining parameters of the configuration data 20, such as reference tire pressure, aircraft identifier and wheel location, along with any security keys of the tire pressure monitoring device 10. Such a numerical value may be communicated to the user 24.

Figure 15:
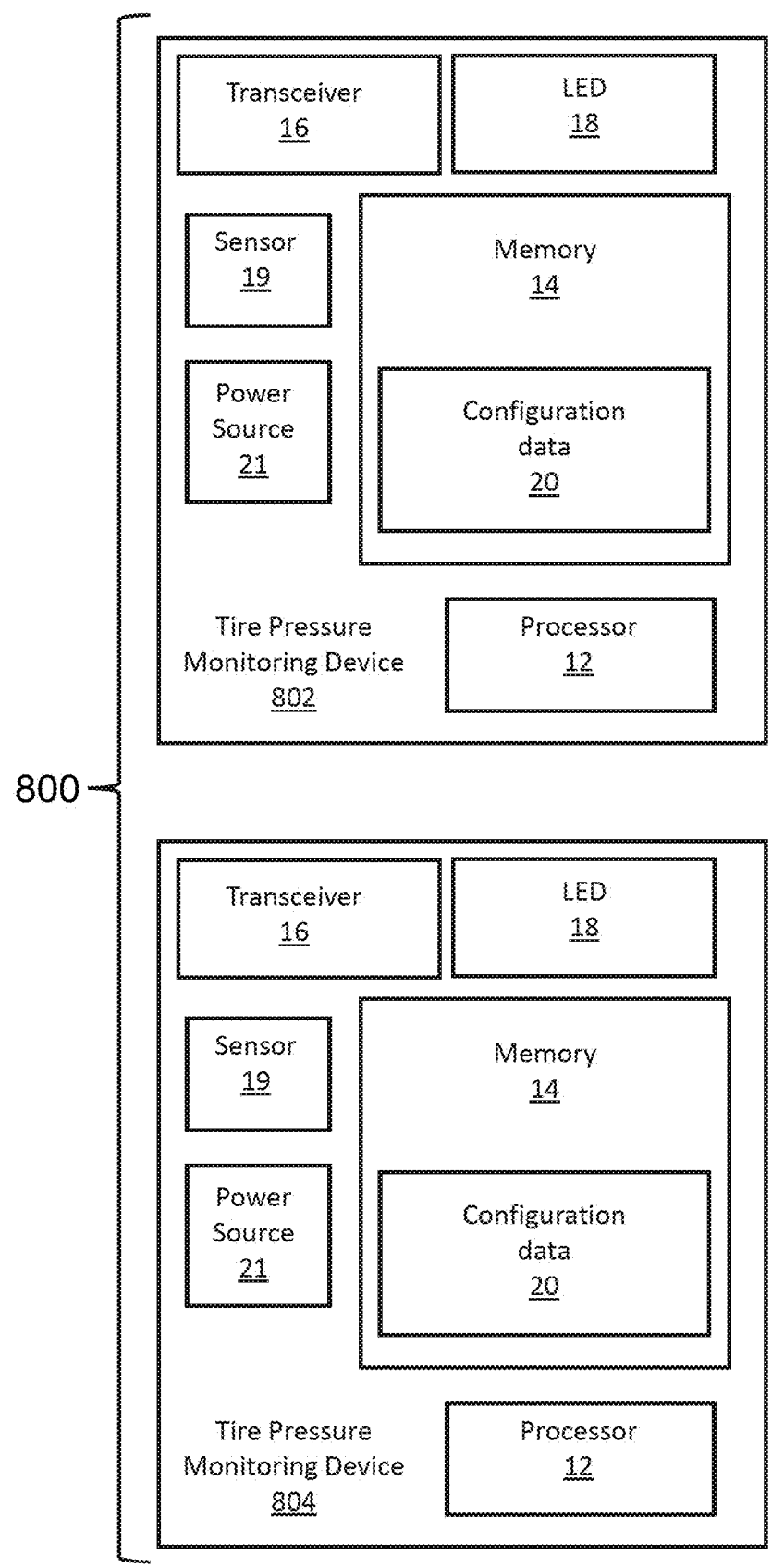
FIG. 15 is a schematic illustration of a second network of tire pressure monitoring devices according to an example.

Communication of a security code may be of particular utility in a network of tire pressure monitoring devices, with such a network 800 illustrated schematically in FIG. 15.

Here the network 800 comprises first 802 and second 804 tire pressure monitoring devices, each having substantially the same structure as the tire pressure monitoring device 10 of FIG. 1. Like reference numerals are used for the sake of clarity. The network 800 has been set-up such that the first 802 and second 804 tire pressure monitoring devices can communicate with one another securely. To do so, each of the first 802 and second 804 tire pressure monitoring devices exchange cryptographic parameters, such as cryptographic keys, such that secure communication between the first 802 and second 804 tire pressure monitoring devices is established.

The processors 12 of the first 802 and second 804 tire pressure monitoring devices each generate a respective security code based on data that is common to the first 802 and second 804 tire pressure monitoring devices. In some examples, such common data may comprise cryptographic keys shared by the first 802 and second tire pressure monitoring devices. Security codes may be generated by taking a hash, or truncated hash, of the common data, to provide a numerical value that can be communicated to the user 24. As the security codes are generated based on common data, the security codes generated by the first 802 and second 804 tire pressure monitoring devices should be the same.

The security codes can then be communicated to the user 24 by flashing of the respective LEDs 18 in a similar manner to that previously described. By verifying that the security codes communicated by the first 802 and second 804 tire pressure monitoring devices are the same, the user 24 can verify that correct establishment of secure communication between the first 802 and second 804 tire pressure monitoring devices has occurred because the devices all share the same data on which the security code is based. It will be appreciated that the security codes themselves can be thought of as forming part of the overall configuration data 20 of the first 802 and second 804 tire pressure monitoring devices.

Figure 10:
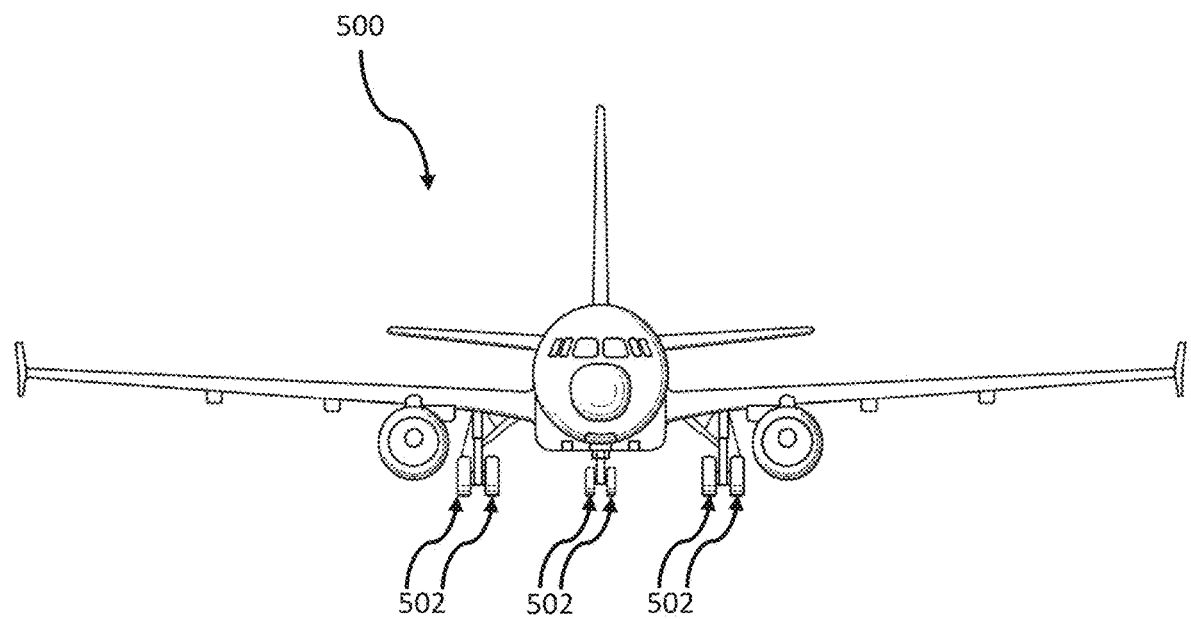
FIG. 10 is a schematic view illustrating an aircraft comprising the tire pressure monitoring device of FIG. 1 or the network of FIG. 7.

The tire pressure monitoring devices described herein may be useful for confirming safety critical configuration data with a high degree of reliability assurance. It is particularly suited for use in aircraft. An aircraft 500 comprising a respective tire pressure monitoring device 10 of FIG. 1 for each tire 502 is shown schematically in FIG. 10. The tire pressure monitoring devices can form a network as discussed above with reference to FIGS. 7 and 15 or operate independently.

It is to be noted that the term "or" as used herein is to be interpreted to mean "and/or", unless expressly stated otherwise.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of communicating configuration data of a tire pressure monitoring device affixed to a wheel of a vehicle, the method comprising, at the tire pressure monitoring device:
   receiving a request to confirm the configuration data; and
   responsive to the receipt of the request to confirm the configuration data, transmitting a configuration data signal which encodes the configuration data;
   wherein the configuration data signal includes data identifying at least one of an intended wheel location on the vehicle to which the tire pressure monitoring device is intended to be located or a security code representative of at least one security parameter of the tire pressure monitoring device;
   wherein the configuration data signal is configured to be received and understood by a human,
   wherein the configuration data signal is indicative of the at least one of the wheel location or the security code,
   wherein the configuration data signal comprises at least one of an audible signal or a visual signal, and
   wherein the audible signal is transmitted using a transducer of the tire pressure monitoring device and/or the visual signal is transmitted using a visual indicator of the tire pressure monitoring device.

2. The method as claimed in claim 1, wherein the visual indicator comprises a light source, and the method further comprises selectively illuminating the light source to transmit the configuration data signal.

3. The method as claimed in claim 2, wherein the configuration data signal comprises a number, and the selective illumination of the light source comprises encoding the number into an illumination sequence representing individual digits of the number.

4. The method as claimed in claim 1, wherein the configuration data signal comprises a start signal indicating a start signal indicating a start of transmission, an end signal indicating an end of the transmission, and an intermediate signal indicative of configuration data stored in the tire pressure monitoring device.

5. The method as claimed in claim 4, wherein the start signal comprises a first type of signal, the intermediate signal comprises a second type of signal, and the end signal comprises a third type of signal.

6. The method as claimed in claim 5, wherein the first type of signal comprises a first color light, the second type of signal comprises a second color light different to the first color light, and the third type of signal comprises a third color light different to the first and second colors of light.

7. The method as claimed in claim 1, wherein the configuration data signal comprises a plurality of sub-signals, each of the sub-signals comprising a start signal indicating a start of transmission of the sub-signal, an end signal indicating an end of transmission of the sub-signal, and an intermediate signal indicative of at least a portion of configuration data stored in the tire pressure monitoring device.

8. The method as claimed in claim 7, wherein each sub-signal is confirmed as being received and understood by a human before a next sequential sub-signal is transmitted.

9. The method as claimed in claim 1, wherein the method further comprises transmitting an alert indicating that the transmission of the configuration data signal is about to begin.

10. The method as claimed in claim 1, wherein the tire pressure monitoring device comprises a trusted tire pressure monitoring device, and the method further comprises:
    verifying, by a human, that the configuration data of the tire pressure monitoring device matches expected configuration data, and
    verification by a human that the configuration data of the trusted tire pressure monitoring device matches expected configuration data takes place using an untrusted device.

11. The method as claimed in claim 10, wherein the expected configuration data comprises a security code representative of security parameters of a further tire pressure monitoring device.

12. The method as claimed in claim 10, wherein a request to confirm configuration data is submitted via a short-range communication protocol.

13. The method as claimed in claim 10, wherein the method further comprises:
transmitting the configuration data signal to a further trusted tire pressure monitoring device, and
subsequently transmitting the configuration data signal from the further trusted tire pressure monitoring device to be received and understood by a human.

14. A tire pressure monitoring device configured to perform the method claimed in claim 1.

15. A tire pressure monitoring device comprising:
a memory configured to store configuration data,
a light source, and
a processor configured to selectively illuminate the light source to transmit a visual signal indicative of the configuration data stored in the memory,
wherein the configuration data identifies at least one of an aircraft wheel location on an aircraft at which the tire pressure monitoring device is intended to be located, or a security code representative of security parameters of the tire pressure monitoring device, and
wherein the tire pressure monitoring device is configured to be affixed to a wheel of a vehicle.

16. An aircraft comprising a tire pressure monitoring device as claimed in claim 15.

17. The method of claim 1, wherein the configuration data and the configuration data signal include the intended wheel location, and
wherein the intended wheel location does not correspond to an actual wheel location on the vehicle.

18. The method of claim 17, further comprising determining that the tire pressure monitoring device is at a wheel location on the vehicle different than the intended wheel location based on the audible signal and/or the visual signal.

19. The method of claim 1, wherein the configuration data and the configuration data signal include the security code representative of the at least one security parameter,
wherein the at least one security parameter includes a security key as a first security parameter and, as a second security parameter, at least one of a reference tire pressure, an identifier of the vehicle and the intended wheel location, and
wherein the security code is generated using a hash function based on the first security parameter and the second security parameter.

20. The method of claim 1, further comprising using the audible signal or the visual signal to obtain the security code from the tire pressure monitoring device,
determining whether the security code obtained from the audible or the visual signal to matches another security code obtained from another tire pressure monitoring device on the vehicle, and
verifying that the tire pressure monitoring device is capable of secure communication with the another tire pressure monitoring device if there is a match between the security code from the audible or visual signal and the another security code.

* * * * *